(12) United States Patent
Tsuruta

(10) Patent No.: US 12,071,977 B2
(45) Date of Patent: Aug. 27, 2024

(54) LINEAR MOTION GUIDE BEARING

(71) Applicant: NIPPON THOMPSON CO., LTD., Tokyo (JP)

(72) Inventor: Kenichiro Tsuruta, Mino (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 138 days.

(21) Appl. No.: 17/759,238

(22) PCT Filed: Nov. 12, 2020

(86) PCT No.: PCT/JP2020/042271
§ 371 (c)(1),
(2) Date: Jul. 21, 2022

(87) PCT Pub. No.: WO2021/149338
PCT Pub. Date: Jul. 29, 2021

(65) Prior Publication Data
US 2023/0051758 A1    Feb. 16, 2023

(30) Foreign Application Priority Data
Jan. 22, 2020   (JP) ................. 2020-008651

(51) Int. Cl.
F16C 29/00     (2006.01)
F16C 29/04     (2006.01)
F16C 29/06     (2006.01)

(52) U.S. Cl.
CPC .......... F16C 29/005 (2013.01); F16C 29/048 (2013.01); F16C 29/06 (2013.01)

(58) Field of Classification Search
CPC ...... F16C 29/005; F16C 29/048; F16C 29/06; F16C 29/0604; F16C 29/0609; F16C 29/0611; F16C 29/0678; B60N 2/0715
See application file for complete search history.

(56) References Cited

U.S. PATENT DOCUMENTS 3,059,978 A * 10/1962 Fall ..................... A47B 88/493
312/334.11
4,348,063 A *  9/1982 Chambers ............. F16C 29/008
384/18

(Continued)

FOREIGN PATENT DOCUMENTS

CN    102105326 A    6/2011
JP    2012-219874 A   11/2012

(Continued)

OTHER PUBLICATIONS

1st Notice of Review Opinion issued in Chinese application No. 202080092228.1, issued on Sep. 20, 2023, with English translation.

*Primary Examiner* — James Pilkington
(74) *Attorney, Agent, or Firm* — Browdy and Neimark, PLLC

(57) ABSTRACT

A linear motion guide bearing 1 includes a rail 10, a slider 20, and a plurality of rolling elements. The slider 20 has formed therein a pair of circulation passages, which are spaces connecting one end and another end in each of a pair of load-carrying races, which are spaces between a pair of first rolling surfaces 41 and a pair of second rolling surfaces 42. In a cross section perpendicular to the longitudinal direction, the rail 10 includes a bottom wall portion 11, a first side wall portion 12, a second side wall portion 13, and a top wall portion 14. One first rolling surface 41 is made up of a wall surface 15A on an inner side of a first corner portion 15, which is a region where the second side wall portion 13 and the bottom wall portion 11 are connected. The other first rolling surface 41 is made up of a wall surface 16A on an inner side of a second corner portion 16, which is a region where the first side wall portion 12 and the top wall portion 14 are connected.

6 Claims, 21 Drawing Sheets

(56) References Cited

U.S. PATENT DOCUMENTS

| | | | | |
|---|---|---|---|---|
| 5,941,495 A | * | 8/1999 | Bauer | B60N 2/0715 |
| | | | | 248/419 |
| 8,303,183 B2 | * | 11/2012 | Chen | A47B 88/487 |
| | | | | 312/334.33 |
| 2011/0089306 A1 | | 4/2011 | Yamada et al. | |
| 2011/0249921 A1 | * | 10/2011 | Huang | F16C 29/048 |
| | | | | 384/18 |

FOREIGN PATENT DOCUMENTS

| | | |
|---|---|---|
| JP | 2013-130210 A | 7/2013 |
| JP | 2015-25494 A | 2/2015 |

\* cited by examiner

LINEAR MOTION GUIDE BEARING

TECHNICAL FIELD

The present invention relates to a linear motion guide bearing.

CROSS REFERENCE TO RELATED APPLICATIONS

The present application claims priority based on Japanese Patent Application No. 2020-008651 filed on Jan. 22, 2020, the entire contents of which are incorporated herein by reference.

BACKGROUND ART

A linear motion guide bearing is known which has a rail having a pair of first rolling surfaces, a slider having a pair of second rolling surfaces opposing the pair of first rolling surfaces, respectively, and a plurality of rolling elements arranged to be able to roll on the first and second rolling surfaces and circulating through annular spaces (see, e.g., Patent Literature 1).

CITATION LIST

Patent Literature

Patent Literature 1: Japanese Patent Application Laid-Open No. 2013-130210

SUMMARY OF INVENTION

Technical Problem

In the above linear motion guide bearing, there are cases where downsizing is required. Even in such cases, it is preferable to allow the rolling elements to circulate smoothly. Therefore, one of the objects is to provide a linear motion guide bearing which enables smooth circulation of the rolling elements even when the linear motion guide bearing is reduced in size.

Solution to Problem

A linear motion guide bearing according to the present disclosure includes: a rail made of a steel plate, having a pair of first rolling surfaces extending parallel to each other in a longitudinal direction; a slider having a pair of second rolling surfaces extending parallel to each other and opposing the pair of first rolling surfaces, respectively; and a plurality of rolling elements disposed to be able to roll on the first and second rolling surfaces. The slider has a pair of circulation passages formed therein, the circulation passages being spaces connecting one end and another end in each of a pair of load-carrying races, the load-carrying races being spaces between the pair of first rolling surfaces and the pair of second rolling surfaces. The plurality of rolling elements circulate in annular spaces configured with the load-carrying races and the circulation passages. In a cross section perpendicular to the longitudinal direction, the rail includes a bottom wall portion, a first side wall portion rising from one end of the bottom wall portion, a second side wall portion rising from another end of the bottom wall portion and opposing the first side wall portion, and a top wall portion extending from an end of the first side wall portion opposite to the bottom wall portion to oppose the bottom wall portion. One of the first rolling surfaces is made up of wall surfaces of the second side wall portion and the bottom wall portion on an inner side of a first corner portion, the first corner portion being a region where the second side wall portion and the bottom wall portion are connected. The other of the first rolling surfaces is made up of wall surfaces of the first side wall portion and the top wall portion on an inner side of a second corner portion, the second corner portion being a region where the first side wall portion and the top wall portion are connected.

Advantageous Effects of Invention

According to the linear motion guide bearing described above, the rolling elements are allowed to circulate smoothly even in the case where the linear motion guide bearing is reduced in size.

DESCRIPTION OF EMBODIMENTS

Outline of Embodiments

Figure 1:
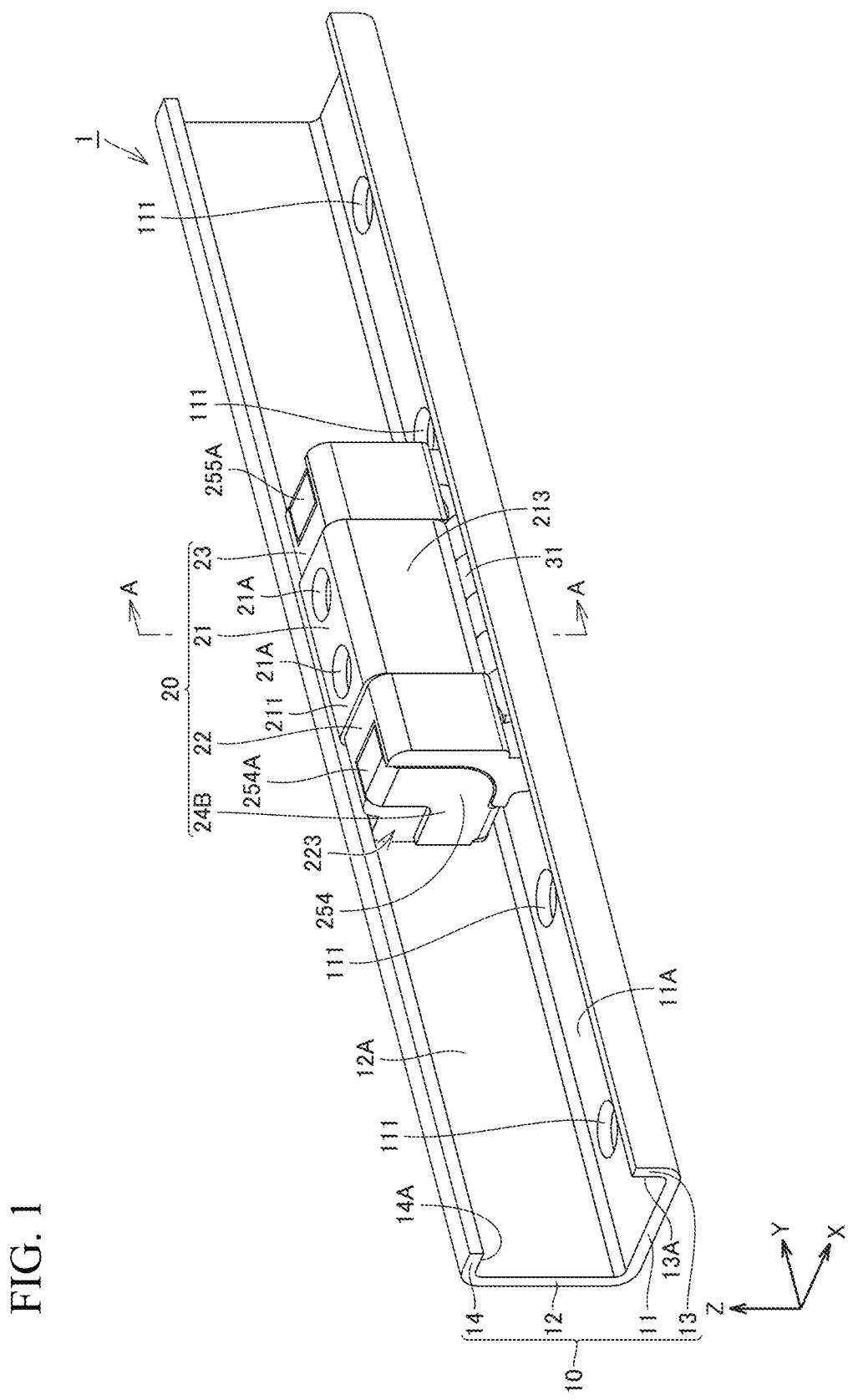
FIG. 1 is a schematic perspective view showing the structure of a linear motion guide bearing in Embodiment 1.

First, embodiments of the present disclosure will be listed and described. A linear motion guide bearing of the present disclosure includes: a rail made of a steel plate, having a pair of first rolling surfaces extending parallel to each other in a longitudinal direction; a slider having a pair of second rolling surfaces extending parallel to each other and opposing the pair of first rolling surfaces, respectively; and a plurality of rolling elements disposed to be able to roll on the first and second rolling surfaces. The slider has a pair of circulation passages formed therein, the circulation passages being spaces connecting one end and another end in each of a pair of load-carrying races, the load-carrying races being spaces between the pair of first rolling surfaces and the pair of second rolling surfaces. The plurality of rolling elements circulate in annular spaces configured with the load-carrying races and the circulation passages. In a cross section perpendicular to the longitudinal direction, the rail includes a bottom wall portion, a first side wall portion rising from one end of the bottom wall portion, a second side wall portion rising from another end of the bottom wall portion and opposing the first side wall portion, and a top wall portion extending from an end of the first side wall portion opposite to the bottom wall portion to oppose the bottom wall portion. One of the first rolling surfaces is made up of wall surfaces of the second side wall portion and the bottom wall portion on an inner side of a first corner portion, the first corner portion being a region where the second side wall portion and the bottom wall portion are connected. The other of the first rolling surfaces is made up of wall surfaces of the first side wall portion and the top wall portion on an inner side of a second corner portion, the second corner portion being a region where the first side wall portion and the top wall portion are connected.

In the linear motion guide bearing of the present disclosure, the rail is made of a steel plate from the standpoints of reducing the production cost and facilitating mass production. The rail can be produced by pressing a steel plate, for example. Such a rail may have decreased working accuracy compared to a rail produced by grinding. This may lead to a decrease in dimensional accuracy of the paths through which the rolling elements circulate. If the rolling elements are reduced in diameter for downsizing the linear motion guide bearing, it may be difficult for the rolling elements to circulate smoothly due to the steps and others caused by the decreased dimensional accuracy as described above. In the linear motion guide bearing of the present disclosure, one first rolling surface is made up of the wall surface on the inner side of the first corner portion where the second side wall portion and the bottom wall portion are connected. The other first rolling surface is made up of the wall surface on the inner side of the second corner portion where the first side wall portion and the top wall portion are connected. Arranging the pair of first rolling surfaces in the above-described manner makes it possible to increase the diameter of the rolling elements. The use of such rolling elements ensures smooth circulation of the rolling elements even if the decrease in dimensional accuracy as described above occurs. As such, according to the linear motion guide bearing of the present disclosure, the rolling elements are allowed to circulate smoothly even when the linear motion guide bearing is reduced in size.

In the linear motion guide bearing described above, the slider may include: a first component made of a bent steel plate, the first component having the pair of second rolling surfaces, a second component fixed to the first component in such a manner that a first circulation passage as a part of one of the circulation passages and a second circulation passage as a part of the other of the circulation passages are formed between the second component and a surface of the steel plate constituting the first component opposite to the surface on which the second rolling surfaces are formed, a third component made of resin, disposed at one end of the first component in the longitudinal direction of the rail, and fixed to the first component so as to form a third circulation passage (first turnaround passage) connecting one of the load-carrying races and the first circulation passage and a fourth circulation passage (second turnaround passage) connecting the other of the load-carrying races and the second circulation passage, and a fourth component made of resin, disposed at another end of the first component in the longitudinal direction of the rail, and fixed to the first component so as to form a fifth circulation passage (third turnaround passage) connecting the one load-carrying race and the first circulation passage and a sixth circulation passage (fourth turnaround passage) connecting the other load-carrying race and the second circulation passage. Adopting such a structure facilitates mass production of the linear motion guide bearing.

In the linear motion guide bearing described above, the second component may be made of resin. The second component being made of resin, which is easy to mold, facilitates mass production of the linear motion guide bearing.

In the linear motion guide bearing described above, the second component may include a first member made of resin, with the first circulation passage formed between the first member and the first component, and a second member made of a bent steel plate, with the second circulation passage formed between the second member and the first component. The second member can be easily produced by press forming a steel plate, for example. The first member is made of resin, which is easy to mold. Therefore, mass production of the linear motion guide bearing is facilitated.

In the linear motion guide bearing described above, the slider may include a first component made of a bent steel plate, the first component having the pair of second rolling surfaces, a second component made of resin, fixed to one end of the first component in the longitudinal direction of the rail, and a third component made of resin, fixed to another end of the first component in the longitudinal direction of the rail. The second and third components may have a first circulation passage as a part of one of the circulation passages and a second circulation passage as a part of the other of the circulation passages formed parallel to the second rolling surfaces across the second and third components. The second component may have formed therein a third circulation passage (first turnaround passage) connecting one of the load-carrying races and the first circulation passage and a fourth circulation passage (second turnaround passage) connecting the other of the load-carrying races and the second circulation passage. The third component may have formed therein a fourth circulation passage (third turnaround passage) connecting the one load-carrying race and the first circulation passage and a sixth circulation passage (fourth turnaround passage) connecting the other load-carrying race and the second circulation passage. Adopting such a structure facilitates mass production of the linear motion guide bearing.

In the linear motion guide bearing described above, the pair of second rolling surfaces in the first component may each have a recess formed extending along the longitudinal direction. Adopting such a configuration facilitates making contact between a second rolling surface and a rolling element at two points across the recess. Accordingly, the rolling elements are allowed to circulate smoothly on the second rolling surfaces.

In the linear motion guide bearing described above, the pair of second rolling surfaces may each have chamfered portions formed at both ends, the chamfered portion being a region where the steel plate is reduced in thickness with decreasing distance to the end of the second rolling surface. Adopting such a configuration enables the rolling elements to circulate smoothly between the first component and the third component and between the first component and the fourth component.

Specific Embodiments

Specific embodiments of the linear motion guide bearing of the present disclosure will be described below with reference to the drawings. In the drawings referenced below, the same or corresponding portions are denoted by the same reference numerals and the description thereof will not be repeated.

Embodiment 1

Figure 2:
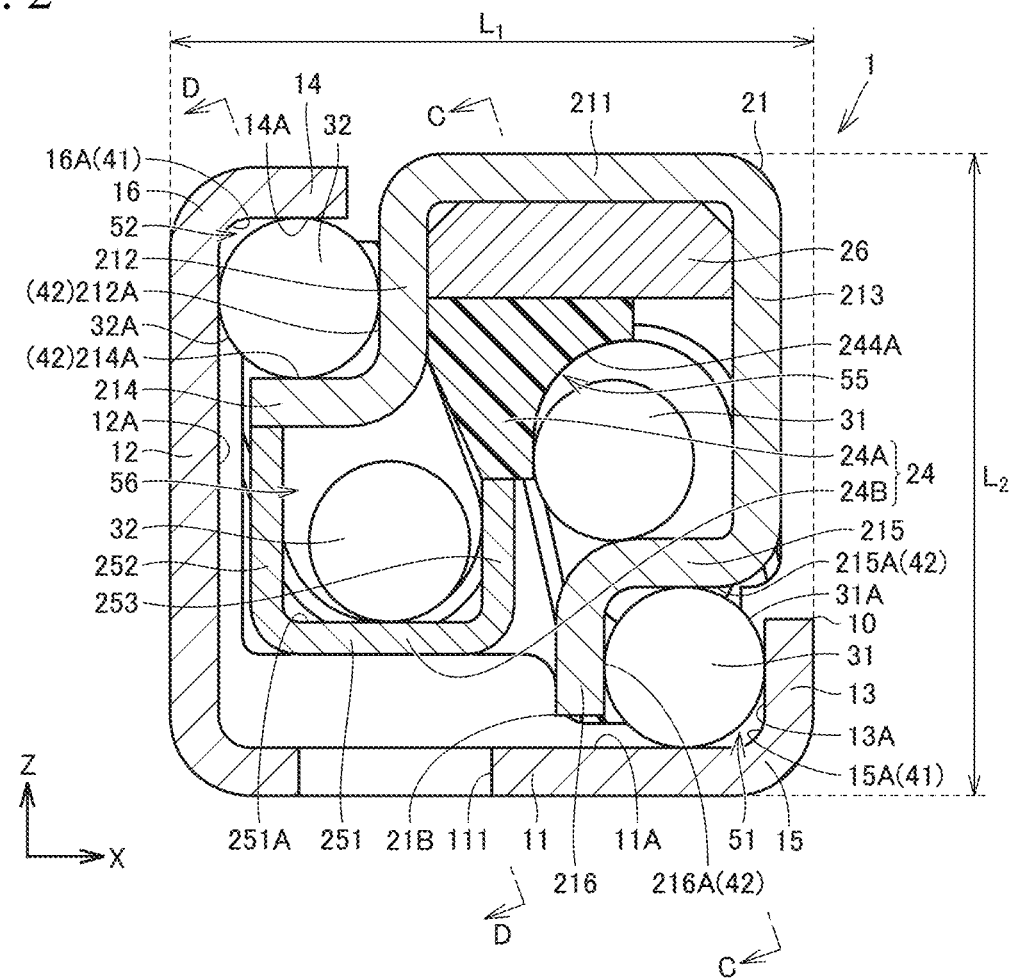
FIG. 2 is a schematic cross-sectional view showing the structure of the linear motion guide bearing in Embodiment 1.
Figure 3:
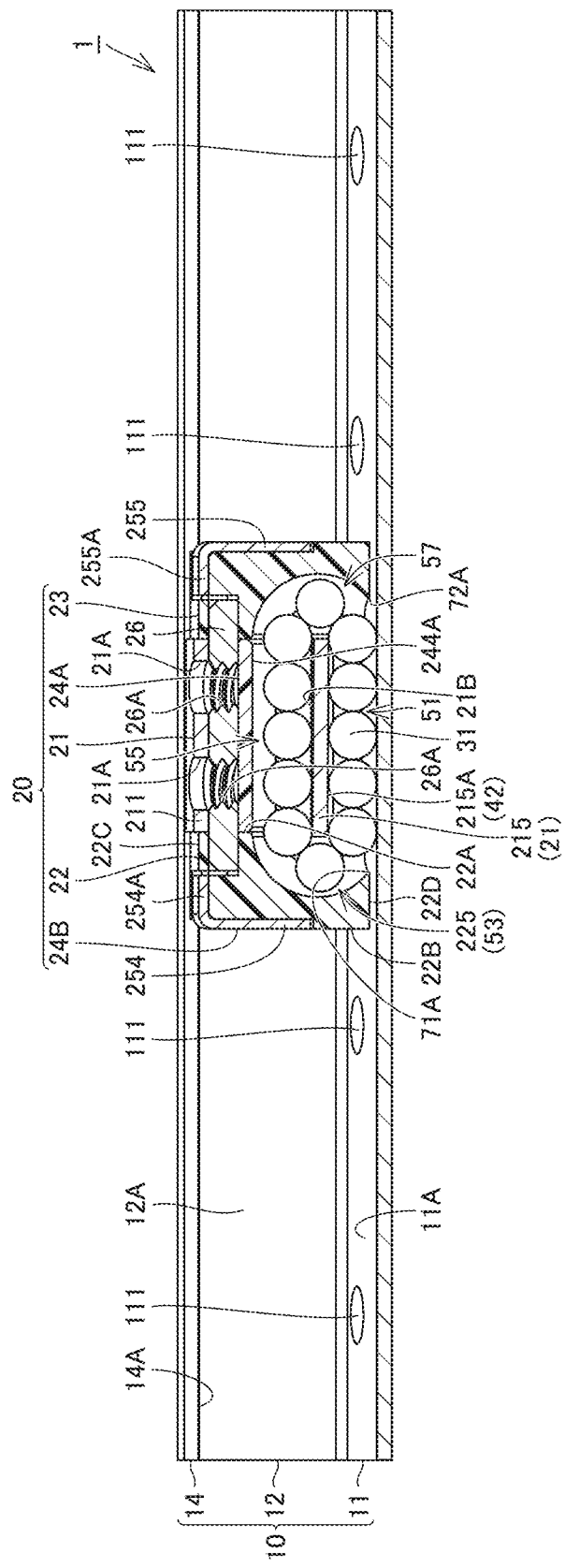
FIG. 3 is a schematic cross-sectional view showing the structure of the linear motion guide bearing in Embodiment 1.
Figure 4:
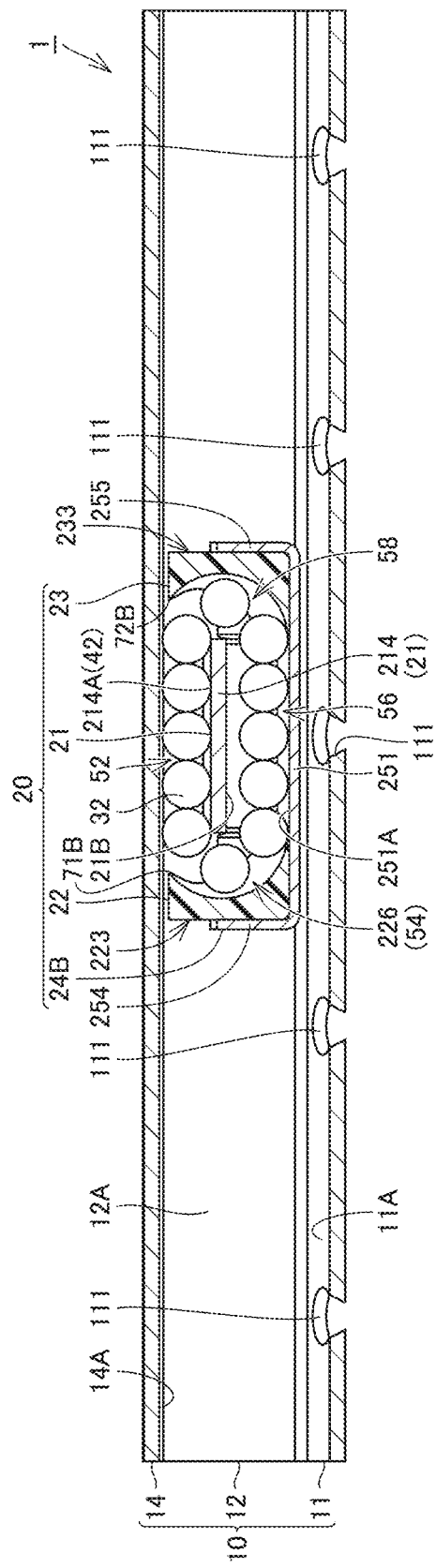
FIG. 4 is a schematic cross-sectional view showing the structure of the linear motion guide bearing in Embodiment 1.
Figure 5:
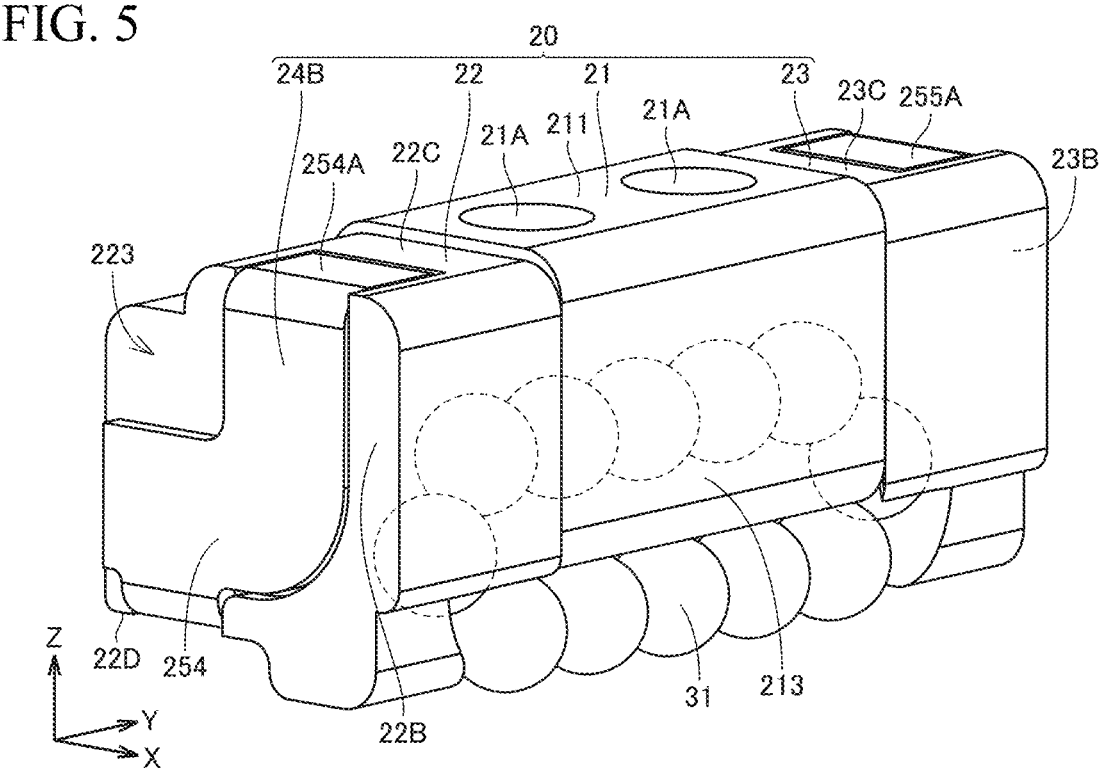
FIG. 5 is a schematic perspective view showing the structure of the linear motion guide bearing, with a rail removed therefrom.
Figure 6:
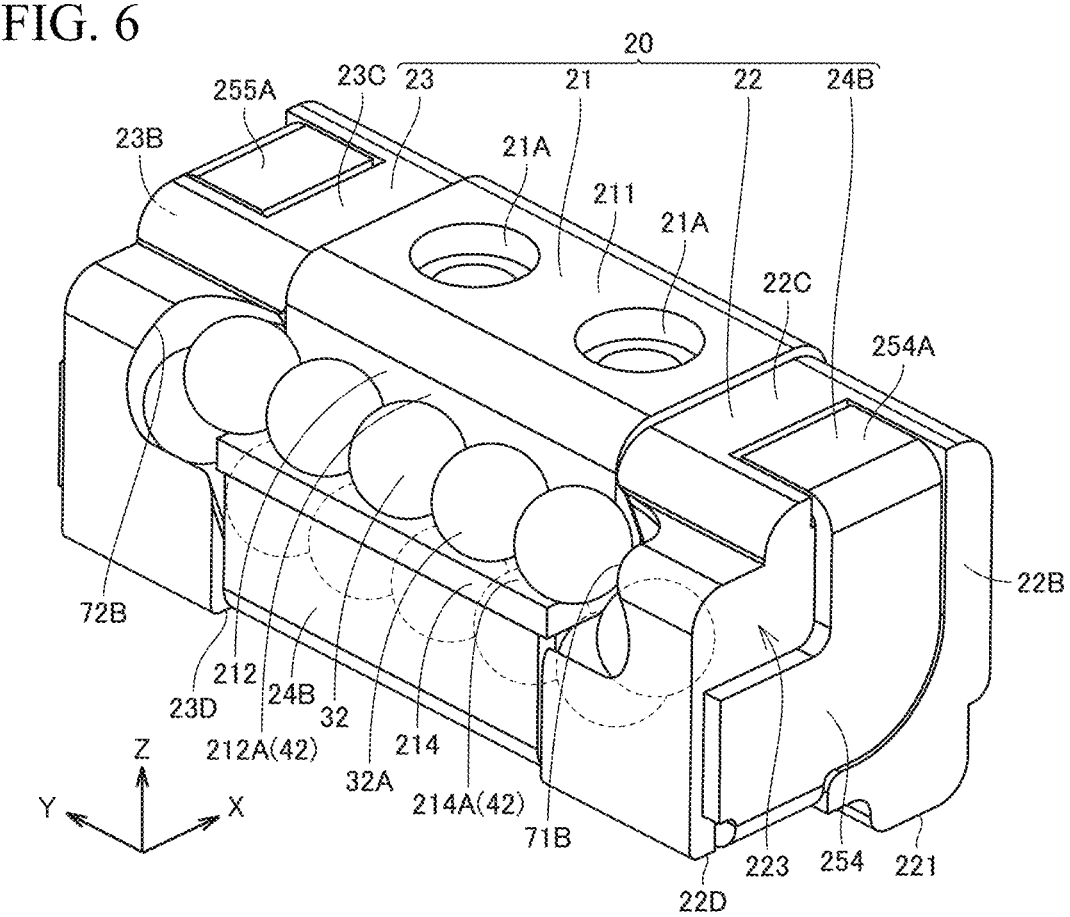
FIG. 6 is a schematic perspective view showing the structure of the linear motion guide bearing, with the rail removed therefrom.
Figure 8:
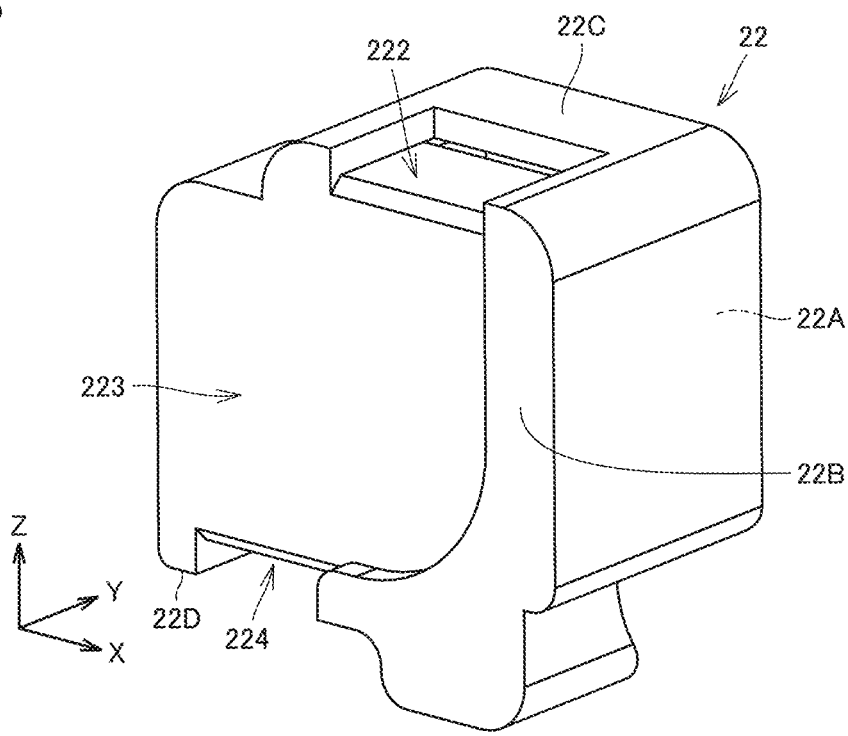
FIG. 8 is a schematic perspective view showing the structure of an end cap.
Figure 9:
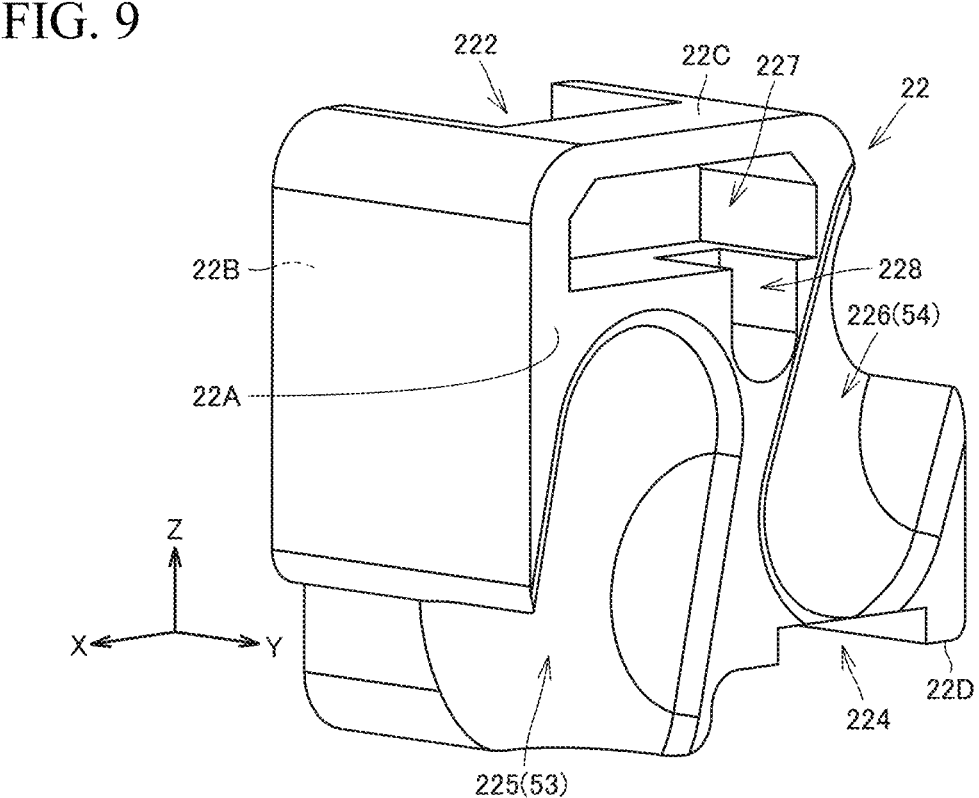
FIG. 9 is a schematic perspective view showing the structure of the end cap.

FIG. 1 is a schematic perspective view showing the structure of a linear motion guide bearing in an embodiment of the present disclosure. In FIG. 1, the Y axis direction is a direction along a longitudinal direction of a rail. FIG. 2 is a cross-sectional view of the linear motion guide bearing taken along A-A (center in the Y axis direction of a slider) in FIG. 1. FIG. 3 is a cross-sectional view of the linear motion guide bearing taken along C-C in FIG. 2. FIG. 4 is a cross-sectional view of the linear motion guide bearing taken along D-D in FIG. 2. FIGS. 5 and 6 are schematic perspective views showing the structure of the linear motion guide bearing, with a rail removed therefrom. FIG. 6 is a perspective view showing the structure of the linear motion guide bearing seen from a different point of view from FIG. 5. FIG. 8 is a schematic perspective view showing the structure of an end cap. FIG. 9 is a perspective view showing the structure of the end cap seen from a different point of view from FIG. 8.

Referring to FIGS. 1 to 4, the linear motion guide bearing 1 includes a rail 10, a slider 20, and a plurality of balls 31, 32 as a plurality of rolling elements. In the present embodiment, the linear motion guide bearing 1 has a length $L_1$ in the X axis direction of 4 mm, for example. The linear motion guide bearing 1 has a length $L_2$ in the Z axis direction of 4 mm, for example.

In the present embodiment, the rail 10 is made of a steel plate worked into a predetermined shape. The rail 10 is produced by press working, for example. Referring to FIGS. 1 and 2, the rail 10 includes a bottom wall portion 11, a first side wall portion 12, a second side wall portion 13, and a top wall portion 14. The bottom wall portion 11 has a flat plate shape. The bottom wall portion 11 has a plurality of through holes 111, penetrating in a thickness direction, formed at equal intervals along the Y axis direction. In a cross section perpendicular to the Y axis direction, the first side wall portion 12 rises from one end of the bottom wall portion 11 along the Z axis direction. In a cross section perpendicular to the Y axis direction, the second side wall portion 13 rises from another end of the bottom wall portion 11. The second side wall portion 13 extends along the Z axis direction. The second side wall portion 13 has its inner wall surface 13A opposing an inner wall surface 12A of the first side wall portion 12. The first side wall portion 12 and the second side wall portion 13 are arranged in parallel. In a cross section perpendicular to the Y axis direction, the top wall portion 14 extends along the X axis direction from an end of the first side wall portion 12 opposite to the bottom wall portion 11. The top wall portion 14 has its inner wall surface 14A opposing an inner wall surface 11A of the bottom wall portion 11. The bottom wall portion 11 and the top wall portion 14 are arranged in parallel.

Figure 7:
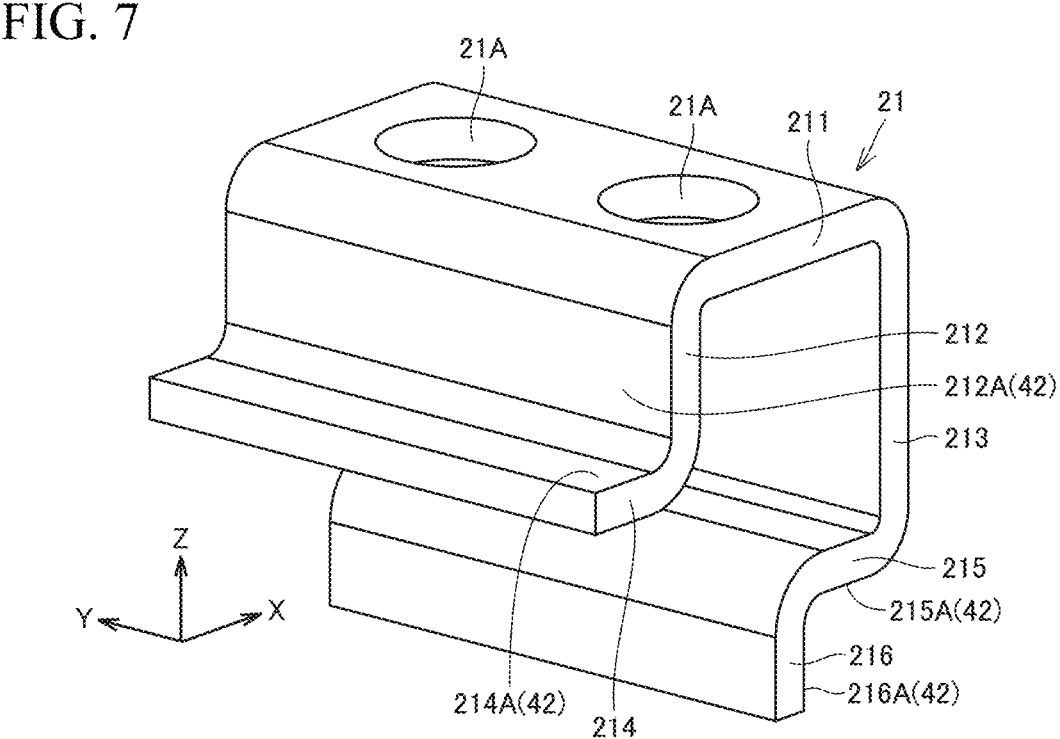
FIG. 7 is a schematic perspective view showing the structure of a carriage.

Referring to FIGS. 2, 5, and 6, the slider 20 includes a carriage 21 as a first component, a circulation component 24 as a second component, end caps 22 and 23 as third and fourth components, and a female threaded component 26. Referring to FIGS. 2 and 7, the carriage 21 includes a first portion 211, a second portion 212, a third portion 213, a fourth portion 214, a fifth portion 215, and a sixth portion 216. In the present embodiment, the carriage 21 is made of a steel plate worked into a predetermined shape. The carriage 21 is produced by press working, for example. In the present embodiment, for the steel constituting the carriage 21, SCM415, SPC material, or SUS304, as specified in the JIS standard, for example, can be adopted. From the standpoint of improving strength, SCM415 may be adopted for the steel constituting the carriage 21. From the standpoint of rust prevention, SUS304 may be adopted for the steel constituting the carriage 21. From the standpoint of improving hardness, the material constituting the carriage 21 may be one that has undergone surface treatment such as carbonitriding treatment, molten salt heat treatment, nitrocarburizing treatment, or the like.

The first portion 211, the second portion 212, the third portion 213, the fourth portion 214, the fifth portion 215, and the sixth portion 216 have a flat plate shape. Referring to FIG. 2, in a cross section perpendicular to the Y axis direction, the second portion 212 extends along the Z axis direction from one end of the first portion 211. The third portion 213 extends along the Z axis direction from another end of the first portion 211. The third portion 213 extends along the second portion 212. The second portion 212 and the third portion 213 are arranged in parallel. The third portion 213 has a length in the Z axis direction longer than a length of the second portion 212 in the Z axis direction. In a cross section perpendicular to the Y axis direction, the fourth portion 214 extends along the X axis direction from an end of the second portion 212 opposite to the first portion 211. In the X axis direction, the fourth portion 214 extends opposite from the first portion 211 as seen from the second portion 212. The first portion 211 and the fourth portion 214 are arranged in parallel. In a cross section perpendicular to the Y axis direction, the fifth portion 215 extends along the X axis direction from an end of the third portion 213 opposite to the first portion 211. The fifth portion 215 extends along the first portion 211. The first portion 211 and the fifth portion 215 are arranged in parallel. In a cross section perpendicular to the Y axis direction, the sixth portion 216 extends along the Z axis direction from an end of the fifth portion 215 opposite to the third portion 213. In the Z axis direction, the sixth portion 216 extends opposite from the third portion 213 as seen from the fifth portion 215.

Referring to FIG. 7, the first portion 211 has a through hole 21A formed penetrating in the thickness direction. In the present embodiment, two through hole 21A are formed spaced apart in the Y axis direction.

Referring to FIG. 1, the end cap 22 and the end cap 23 have plane symmetrical shapes with the A-A cross section as the reference plane. Referring to FIGS. 5 and 6, the end cap 22 is fixed to one end in the Y axis direction of the carriage 21. The end cap 23 is fixed to another end in the Y axis direction of the carriage 21. The end caps 22 and 23 are components for redirecting balls 31, 32 described later. The end caps 22 and 23 are made of resin. Referring to FIGS. 1, 8, and 9, the end cap 22 has a surface 22A in contact with the carriage 21, a surface 22B opposite to the surface 22A in the Y axis direction, and surfaces 22C and 22D connecting the surface 22A and the surface 22B. The surface 22C has a recess 222 formed therein. The surface 22B has a recess 223 formed therein. The surface 22D has a recess 224 formed therein. The surface 22A has a first recess 225 and a second recess 226 formed apart from each other. The first recess 225 and the second recess 226 are formed spaced apart in the X axis direction. The surface 22A has recesses 227 and 228 formed apart from the first recess 225 and the second recess 226.

Figure 10:
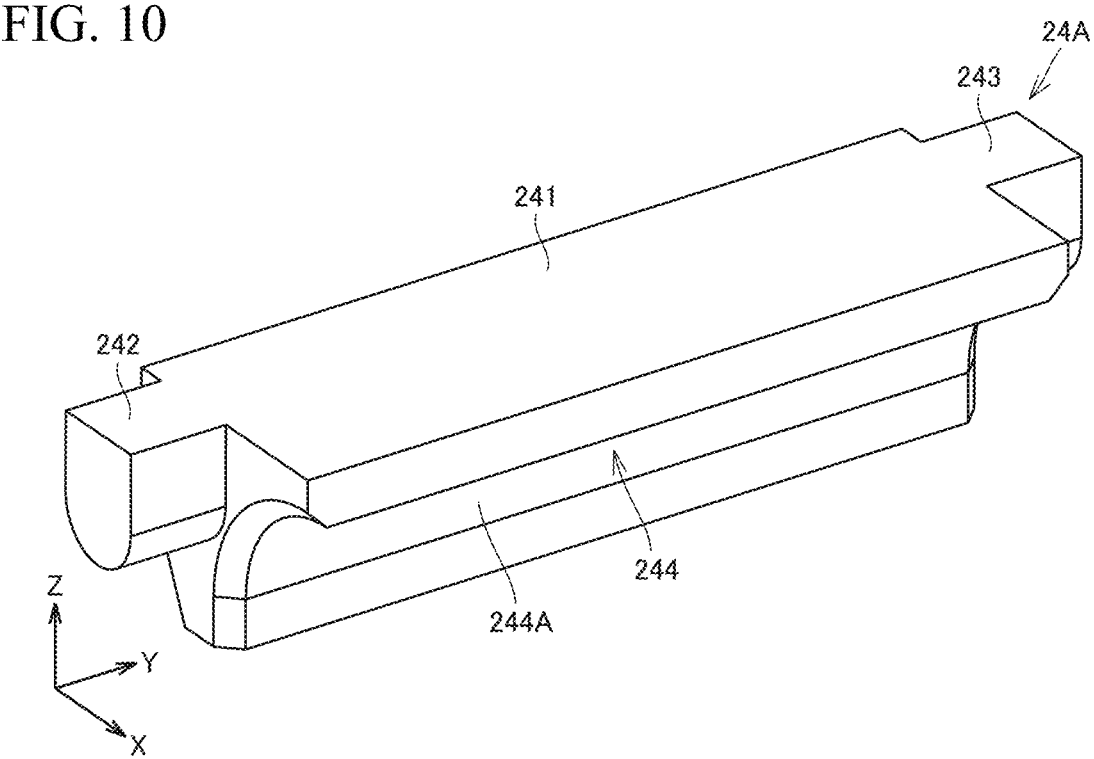
FIG. 10 is a schematic perspective view showing the structure of a first member.

Referring to FIG. 2, the circulation component 24 includes a resin member 24A as a first member and a steel plate member 24B as a second member. The steel plate member 24B is a circulation component for circulation of the balls 31, 32 described later. Referring to FIG. 10, the resin member 24A includes a body portion 241 and protruding portions 242 and 243. In the present embodiment, the resin member 24A is made of resin. The body portion 241 extends along the Y axis direction. The body portion 241 has a fifth recess 244 formed extending along the Y axis direction. In the present embodiment, the fifth recess 244 has an arc shape. The resin member 24A has the protruding portion 242 which protrudes along the Y axis direction from one end of the body portion 241. The protruding portion 242 can be fitted in the recess 228 in the end cap 22. The resin member 24A has the protruding portion 243 which protrudes along the Y axis direction from another end of the body portion 241.

Figure 11:
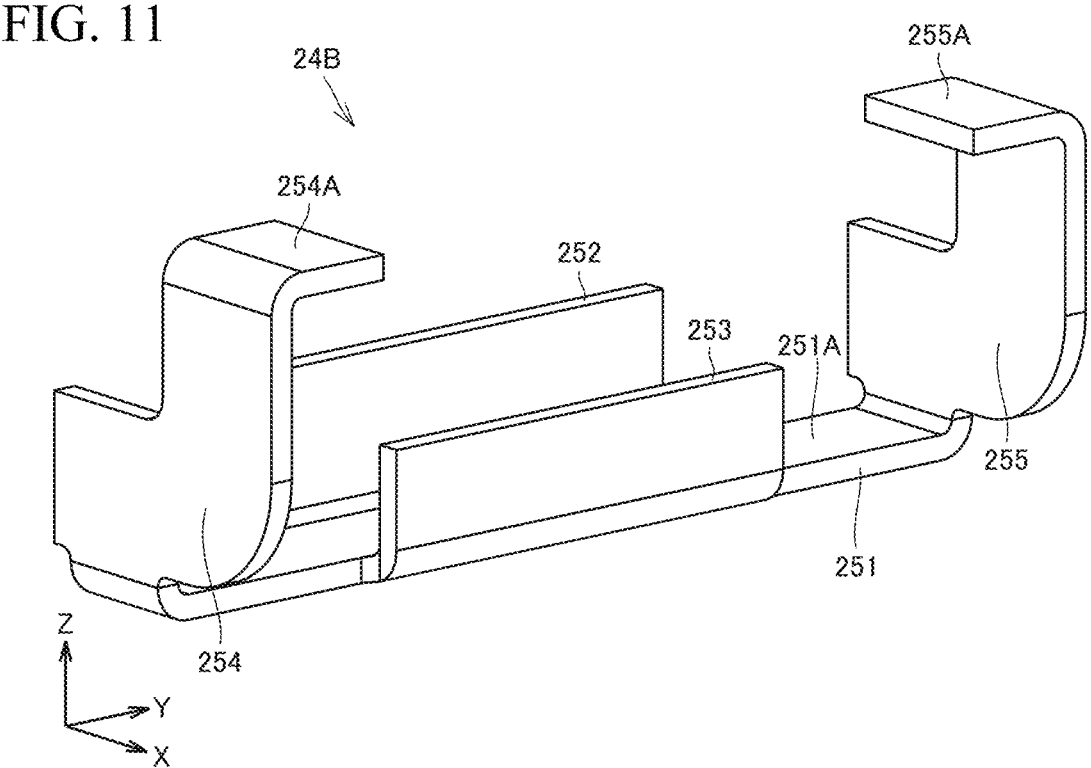
FIG. 11 is a schematic perspective view showing the structure of a second member.

The steel plate member 24B is made of a steel plate worked into a predetermined shape. The steel plate member 24B can be produced by press working, for example. Referring to FIG. 11, the steel plate member 24B includes a first plate-shaped portion 251, a second plate-shaped portion 252, a third plate-shaped portion 253, a fourth plate-shaped portion 254, and a fifth plate-shaped portion 255. Referring to FIGS. 8, 9, and 11, the first plate-shaped portion 251 can be fitted in the recess 224 in the end cap 22. The second plate-shaped portion 252 extends along the Z axis direction from one long side of the first plate-shaped portion 251. The third plate-shaped portion 253 extends along the Z axis direction from another long side of the first plate-shaped portion 251. The third plate-shaped portion 253 extends along the second plate-shaped portion 252. The second plate-shaped portion 252 and the third plate-shaped portion 253 are arranged in parallel. The fourth plate-shaped portion 254 extends along the Z axis direction from one short side of the first plate-shaped portion 251. The fourth plate-shaped portion 254 has a hook portion 254A that bends along the Y axis direction. The hook portion 254A extends parallel to the first plate-shaped portion 251. The hook portion 254A has a shape corresponding to the recess 222 in the end cap 22. The fifth plate-shaped portion 255 extends along the Z axis direction from another short side of the first plate-shaped portion 251. The fifth plate-shaped portion 255 has a hook portion 255A that bends along the Y axis direction. The hook portion 255A extends parallel to the first plate-shaped portion 251.

Figure 12:
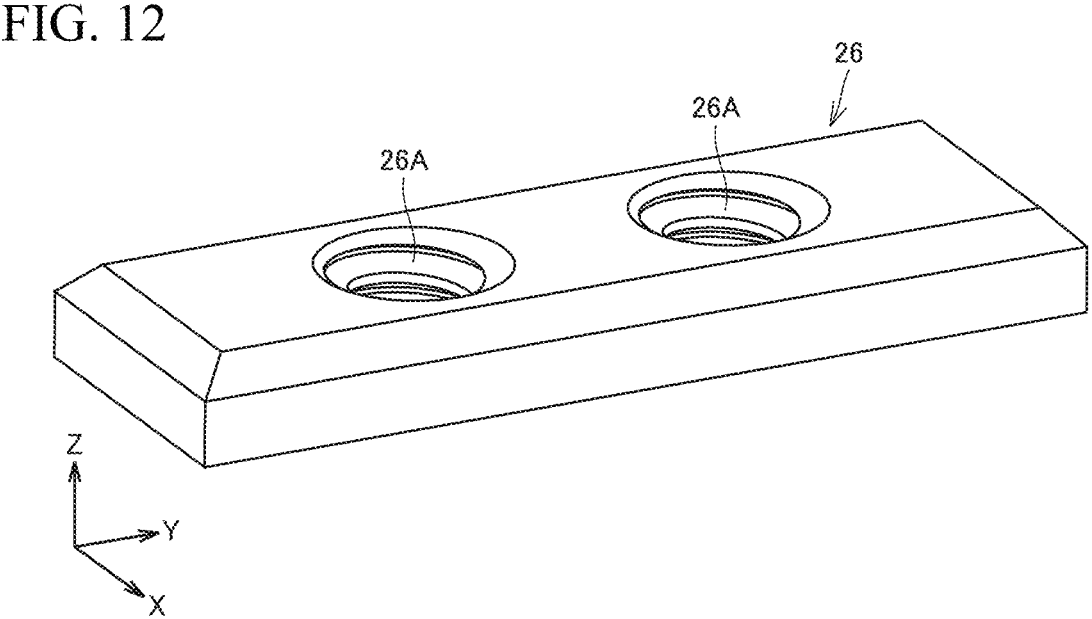
FIG. 12 is a schematic perspective view showing the structure of a female threaded component.

Referring to FIG. 12, the female threaded component 26 has a plate shape. In the female threaded component 26, two screw holes 26A penetrating in the thickness direction are formed spaced apart in the Y axis direction. Referring to FIGS. 9 and 12, the female threaded component 26 can be fitted in the recess 227.

Referring to FIGS. 1, 8, and 11, the end cap 22 is disposed between the fourth plate-shaped portion 254 of the steel plate member 24B on one side and the second plate-shaped portion 252 and the third plate-shaped portion 253 on the other side. At this time, the first plate-shaped portion 251 is fitted in the recess 224. The fourth plate-shaped portion 254 is fitted in the recess 223, and the hook portion 254A is fitted in the recess 222. The end cap 23 is also attached to the steel plate member 24B in a similar manner to the end cap 22.

Referring to FIGS. 8, 9, and 10, the protruding portion 242 of the resin member 24A is fitted in the recess 228 of the end cap 22. Similarly, the resin member 24A is attached to the end cap 23. Referring to FIGS. 9 and 12, the female threaded component 26 is fitted in the recess 227 of the end cap 22. Similarly, the female threaded component 26 is attached to the end cap 23. Referring to FIGS. 6, 7, and 12, the carriage 21 is disposed between the end cap 22 and the end cap 23. At this time, the carriage 21 is arranged such that the positions of the through holes 21A formed in the carriage 21 are aligned with the positions of the screw holes 26A formed in the female threaded component 26. The through hole 21A has a diameter greater than that of the screw hole 26A. With the positions of screw holes (not shown) formed in a component to which the carriage 21 is to be attached, the positions of the through holes 21A formed in the carriage 21, and the positions of the screw holes 26A formed in the female threaded component 26 aligned with each other, screws (not shown) are screwed in. The carriage 21 and the female threaded component 26 are thus connected via screws.

Referring to FIG. 2, the slider 20 is disposed on the rail 10. At this time, the slider 20 is arranged in such a manner that an outer wall surface 212A of the second portion 212 in the carriage 21 opposes the inner wall surface 12A of the first side wall portion 12 in the rail 10 and an outer wall surface 214A of the fourth portion 214 opposes the inner wall surface 14A of the top wall portion 14, and further that an outer wall surface 215A of the fifth portion 215 opposes the inner wall surface 11A of the bottom wall portion 11 and an outer wall surface 216A of the sixth portion 216 opposes the inner wall surface 13A of the second side wall portion 13.

A first load-carrying race (load race) 51 is formed between a wall surface 15A of the second side wall portion 13 and the bottom wall portion 11 on an inner side of a first corner portion 15, which is a region where the second side wall portion 13 and the bottom wall portion 11 of the rail 10 are connected, and the outer wall surfaces 215A and 216A of the fifth and sixth portions 215 and 216 in the carriage 21. A second load-carrying race (load race) 52 is formed between a wall surface 16A of the top wall portion 14 and the first side wall portion 12 on an inner side of a second corner portion 16, which is a region where the top wall portion 14 and the first side wall portion 12 are connected, and the outer wall surfaces 212A and 214A of the second and fourth portions 212 and 214. The first load-carrying race (load race) 51 and the second load-carrying race (load race) 52 extend in parallel along the Y axis direction. Referring to FIGS. 2, 3, and 10, a first circulation passage (return passage) 55 is formed between a wall surface 244A surrounding the fifth recess 244 in the resin member 24A and an inner wall surface 21B of the steel plate constituting the carriage 21. The first circulation passage (return passage) 55 and the first load-carrying race (load race) 51 are formed with the carriage 21 sandwiched therebetween. Referring to FIGS. 2, 4, and 11, a second circulation passage (return passage) 56 is formed between one surface 251A of the first plate-shaped portion 251 in the steel plate member 24B and the inner wall surface 21B of the steel plate constituting the carriage 21. The second load-carrying race (load race) 52 and the second circulation passage (return passage) 56 are formed with the carriage 21 sandwiched therebetween.

Referring to FIGS. 3 and 4, the end cap 22 has formed therein a third circulation passage (first turnaround passage) 53 connecting the first load-carrying race (load race) 51 and the first circulation passage (return passage) 55. The end cap 22 has formed therein a fourth circulation passage (second turnaround passage) 54 connecting the second load-carrying race (load race) 52 and the second circulation passage (return passage) 56. The end cap 23 has formed therein a fifth circulation passage (third turnaround passage) 57 connecting the first load-carrying race (load race) 51 and the first circulation passage (return passage) 55. The end cap 23 has formed therein a sixth circulation passage (fourth turnaround passage) 58 connecting the second load-carrying race (load race) 52 and the second circulation passage (return passage) 56. In this manner, the first load-carrying race (load race) 51, the first circulation passage (return passage) 55, the third circulation passage (first turnaround passage) 53, and the fifth circulation passage (third turnaround passage) 57 form an annular space. The second load-carrying race (load race) 52, the second circulation passage (return passage) 56, the fourth circulation passage (second turnaround passage) 54, and the sixth circulation passage (fourth turnaround passage) 58 form an annular space. The end caps 22 and 23 have scooping beaks 71A, 71B, 72A, and 72B. The scooping beak 71A is formed at a boundary between the third circulation passage (first turnaround passage) 53 and the first load-carrying race (load race) 51. The scooping beak 71B is formed at a boundary between the fourth circulation passage (second turnaround passage) 54 and the second load-carrying race (load race) 52. The scooping beak 72A is formed at a boundary between the fifth circulation passage (third turnaround passage) 57 and the first load-carrying race (load race) 51. The scooping beak 72B is formed at a boundary between the sixth circulation passage (fourth turnaround passage) 58 and the second load-carrying race (load race) 52. The scooping beaks 71A and 72A scoop balls 31 rolling on the first load-carrying race (load race) 51, and guide the balls 31 to the third circulation passage (first turnaround passage) 53 or the fifth circulation passage (third turnaround passage) 57. The scooping beaks 71B and 72B scoop balls 32 rolling on the second load-carrying race (load race) 52, and guide the balls 32 to the fourth circulation passage (second turnaround passage) 54 or the sixth circulation passage (fourth turnaround passage) 58. The scooping beaks 71A, 71B, 72A, and 72B enable smooth and endless circulation of the balls 31 and 32.

Referring to FIGS. 3 and 4, the balls 31 circulate through the annular space formed by the first load-carrying race (load race) 51, the first circulation passage (return passage) 55, the third circulation passage (first turnaround passage) 53, and the fifth circulation passage (third turnaround passage) 57. In the present embodiment, a ball 31 has a diameter of 0.8 mm or more and 1.3 mm or less, for example. The balls 31 are disposed to be able to roll on the inner wall surface 15A of the first corner portion 15 and on the outer wall surfaces 215A and 216A of the fifth and sixth portions 215 and 216. The balls 31 have their outer circumferential surfaces 31A coming into contact with the wall surface 15A and the outer wall surfaces 215A and 216A. That is, the inner wall surface 15A of the first corner portion 15 constitutes a first rolling surface 41. The outer wall surface 215A of the fifth portion 215 and the outer wall surface 216A of the sixth portion 216 constitute a second rolling surface 42. The first rolling surface 41 and the ball 31 are in two-point contact. The second rolling surface 42 and the ball 31 are in two-point contact.

The balls 32 circulate through the annular space formed by the second load-carrying race (load race) 52, the second circulation passage (return passage) 56, the fourth circulation passage (second turnaround passage) 54, and the sixth circulation passage (fourth turnaround passage) 58. The balls 32 are disposed to be able to roll on the inner wall surface 16A of the second corner portion 16 and on the outer wall surfaces 212A and 214A of the second and fourth portions 212 and 214. The balls 32 have their outer circumferential surfaces 32A coming into contact with the wall surface 16A and the outer wall surfaces 212A and 214A. That is, the inner wall surface 16A of the second corner portion 16 constitutes a first rolling surface 41. The outer wall surface 212A of the second portion 212 and the outer wall surface 214A of the fourth portion 214 constitute a second rolling surface 42. The first rolling surface 41 and the ball 32 are in two-point contact. The second rolling surface 42 and the ball 32 are in two-point contact. It should be noted that in the present embodiment, a ratio of the diameter of the ball 31, 32 to the length $L_1$ (ball (31, 32) diameter/$L_1$) is set to be 0.2 or more and 0.33 or less, for example. Similarly, a ratio of the diameter of the ball 31, 32 to the length $L_2$ (ball (31, 32) diameter/$L_2$) is set to be 0.2 or more and 0.33 or less, for example. Setting the ratios in such a range enables downsizing of the linear motion guide bearing 1 while increasing the diameters of the balls 31 and 32.

The first rolling surface 41 constituted by the inner wall surface 15A of the first corner portion 15 and the first rolling surface 41 constituted by the inner wall surface 16A of the second corner portion 16 are arranged in parallel. The second rolling surface 42 constituted by the outer wall surfaces 215A and 216A of the fifth and sixth portions 215 and 216 and the second rolling surface 42 constituted by the outer wall surfaces 212A and 214A of the second and fourth portions 212 and 214 are arranged in parallel.

Here, in the linear motion guide bearing 1 in the present embodiment, one first rolling surface 41 is made up of the wall surface 15A on the inner side of the first corner portion 15, which is the region where the second side wall portion 13 and the bottom wall portion 11 are connected. The other first rolling surface 41 is made up of the wall surface 16A on the inner side of the second corner portion 16, which is the region where the top wall portion 14 and the first side wall portion 12 are connected. Arranging the first rolling surfaces 41 in the above-described manner makes it possible to increase the diameters of the balls 31 and 32. If the balls 31 and 32 are reduced in diameter for the purpose of downsizing the linear motion guide bearing 1, smooth circulation of the balls 31 and 32 may become difficult due to the influence of gaps and steps generated between the components. With the reduced diameters of the balls 31 and 32, assembly of the linear motion guide bearing 1 may become difficult, or the load rating may become small. Increasing the diameters of the balls 31 and 32 leads to smooth circulation of the balls 31 and 32. Therefore, in the linear motion guide bearing 1 in the above embodiment, the balls 31 and 32 circulate smoothly even when the bearing is reduced in size. It should be noted that the linear motion guide bearing 1 in the present embodiment is used, for example, in the state where two linear motion guide bearings 1 are placed in parallel.

In the above embodiment, the slider 20 includes the carriage 21 made of a steel plate, the circulation component 24, the end cap 22 made of resin, and the end cap 23 made of resin. Adopting such a configuration facilitates mass production of the linear motion guide bearing 1.

In the above embodiment, the circulation component 24 includes the resin member 24A made of resin and the steel plate member 24B made of a steel plate. The steel plate member 24B can be produced easily, for example, by press forming the steel plate. The resin member 24A is made of resin, which is easy to mold. Therefore, the linear motion guide bearing 1 in the present embodiment is improved in workability and ease of assembly, which facilitates mass production of the linear motion guide bearing 1. Further, with the circulation component 24 being composed of the resin member 24A and the steel plate member 24B, the circulation component 24 can be reduced in size. This leads to reduction in size of the linear motion guide bearing 1. The resin member 24A can be used to separate the first circulation passage (return passage) 55 and the second circulation passage (return passage) 56. The use of the resin member 24A can also reduce the noise caused by the circulation of the balls 31 and 32.

Embodiment 2

A description will now be made of Embodiment 2 of the linear motion guide bearing 1 of the present disclosure. The linear motion guide bearing 1 in Embodiment 2 basically has a similar structure and exerts similar effects as the linear motion guide bearing 1 in Embodiment 1. However, Embodiment 2 differs from Embodiment 1 in that the resin member 24A and the steel plate member 24B are made as one piece. The points different from the case of Embodiment 1 will be mainly described below.

Figure 13:
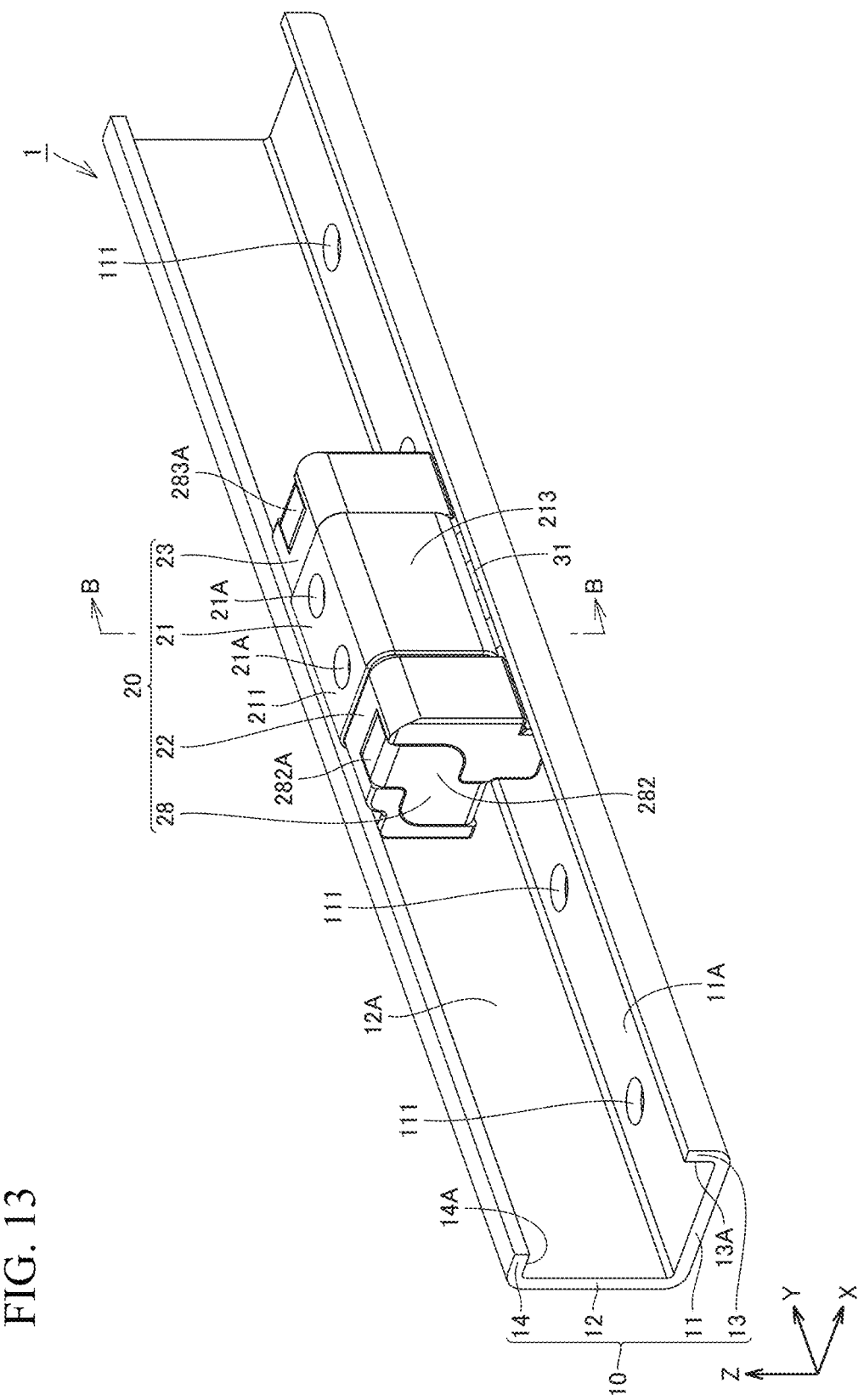
FIG. 13 is a schematic perspective view showing the structure of a linear motion guide bearing in Embodiment 2.
Figure 15:
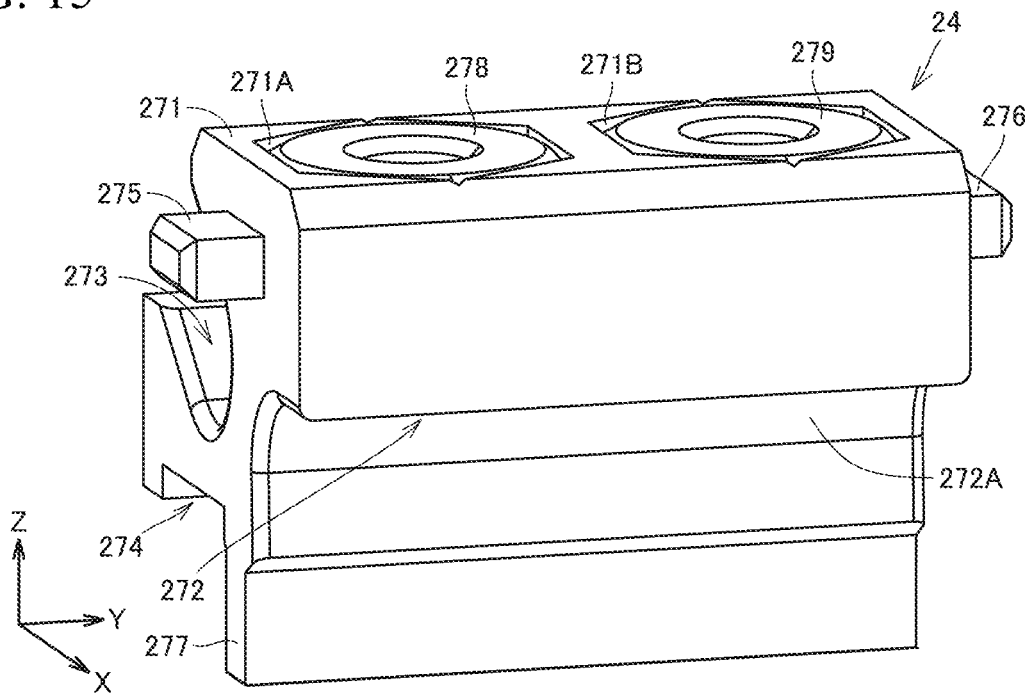
FIG. 15 is a schematic perspective view showing the structure of a second component.
Figure 16:
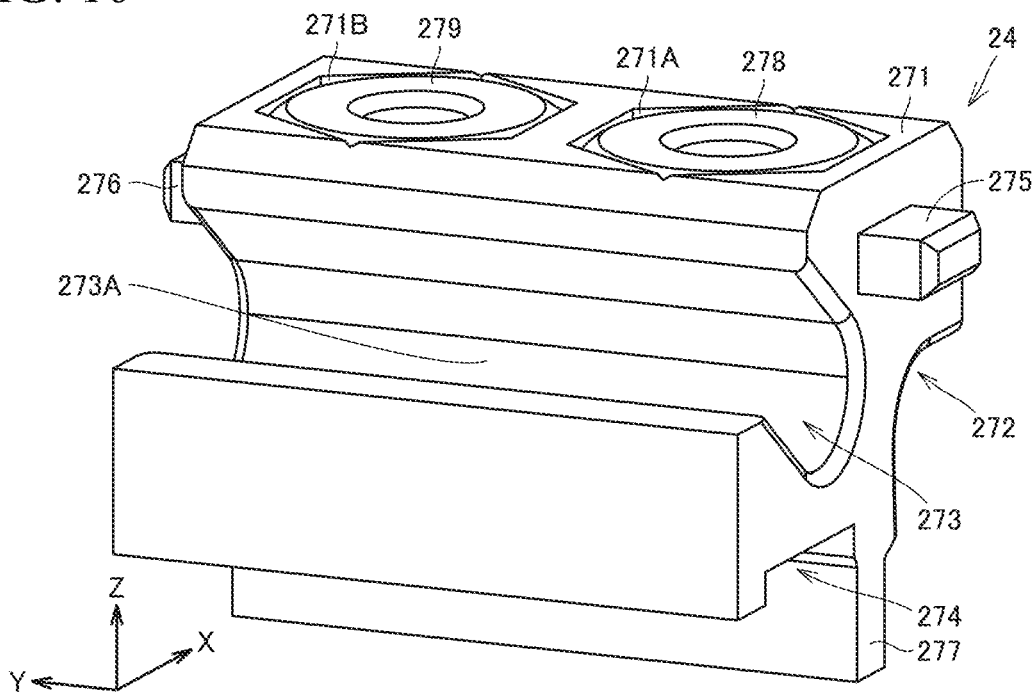
FIG. 16 is a schematic perspective view showing the structure of the second component.
Figure 17:
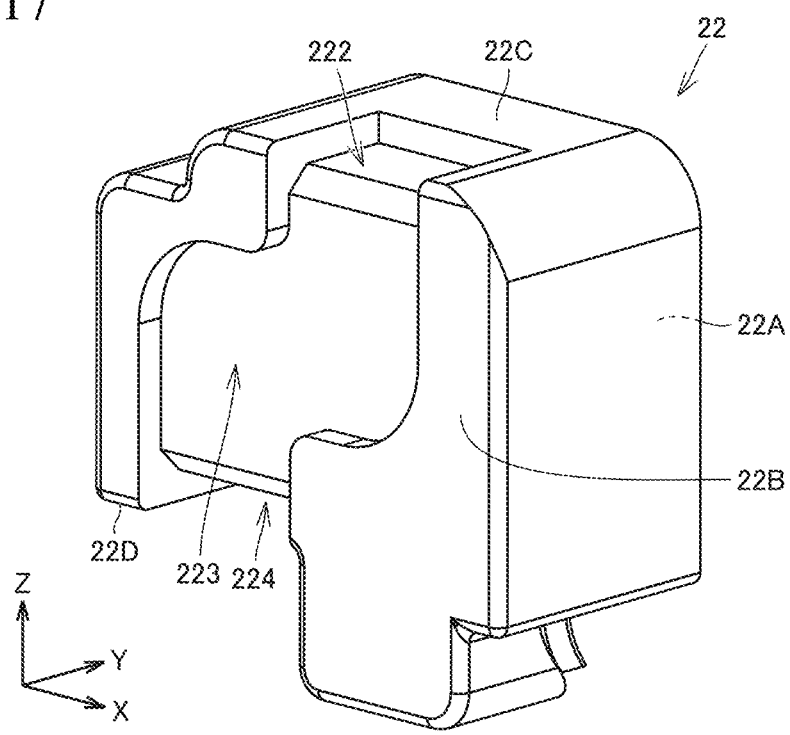
FIG. 17 is a schematic perspective view showing the structure of an end cap.
Figure 18:
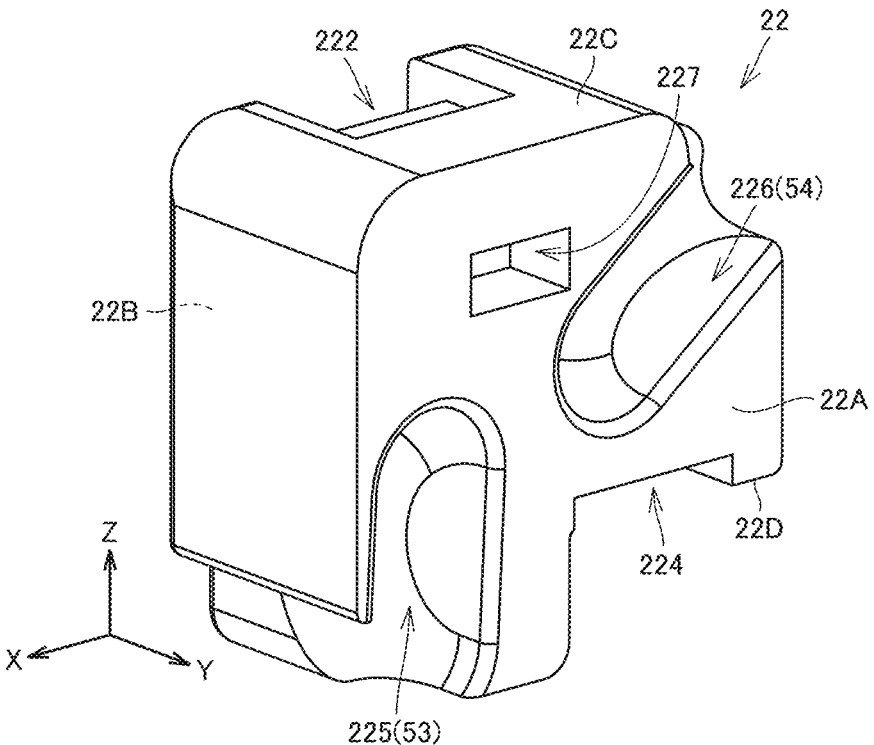
FIG. 18 is a schematic perspective view showing the structure of the end cap.

FIG. 13 is a schematic perspective view showing the structure of a linear motion guide bearing 1 in Embodiment 2. FIG. 15 is a cross-sectional view of the linear motion guide bearing 1 taken along B-B (center in the Y axis direction of a slider 20) in FIG. 14. FIG. 15 is a schematic perspective view showing the structure of a circulation component 24. FIG. 16 is a perspective view showing the structure of the linear motion guide bearing 1 seen from a different point of view from FIG. 15. FIG. 17 is a schematic perspective view showing the structure of an end cap 22. FIG. 18 is a perspective view showing the structure of the end cap 22 seen from a different point of view from FIG. 17.

Figure 14:
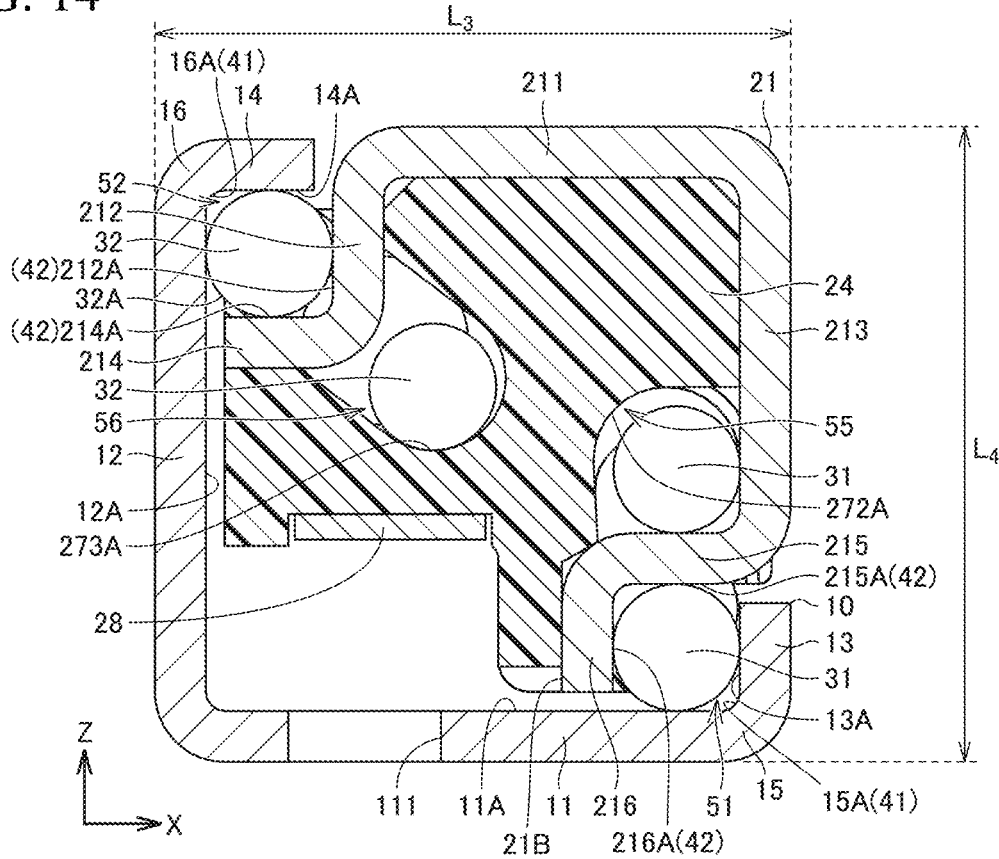
FIG. 14 is a schematic cross-sectional view showing the structure of the linear motion guide bearing in Embodiment 2.

Referring to FIG. 14, the linear motion guide bearing 1 in the present embodiment has a length $L_3$ in the X axis direction of 10 mm, for example. It has a length La in the Z axis direction of 10 mm, for example. Referring to FIGS. 13, 14, and 15, a slider 20 includes a carriage 21, a circulation component 24, end caps 22, 23, a connection member 28, and nuts 278, 279. Referring to FIGS. 15 and 16, the circulation component 24 includes a body portion 271 and protruding portions 275, 276. The circulation component 24 is made of resin. The body portion 271 has a sixth recess 272 and a seventh recess 273 formed extending along the Y axis direction. The sixth recess 272 and the seventh recess 273 are formed to sandwich the body portion 271 therebetween. The sixth recess 272 and the seventh recess 273 are formed in parallel. The sixth recess 272 and the seventh recess 273 have an arc shape. The body portion 271 has a recess 271A and a recess 271B formed spaced apart in the Y axis direction. The nuts 278 and 279 are fitted in the recesses 271A and 271B. The body portion 271 has a recess 274 formed away from the sixth recess 272 and the seventh recess 273 and extending along the Y axis direction. The circulation component 24 has the protruding portion 275 which protrudes along the Y axis direction from one end of the body portion 271. Referring to FIGS. 15, 17, and 18, the protruding portion 275 can be fitted in the recess 227 in the end cap 22. The circulation component 24 has the protruding portion 276 which protrudes along the Y axis direction from another end of the body portion 271.

Figure 19:
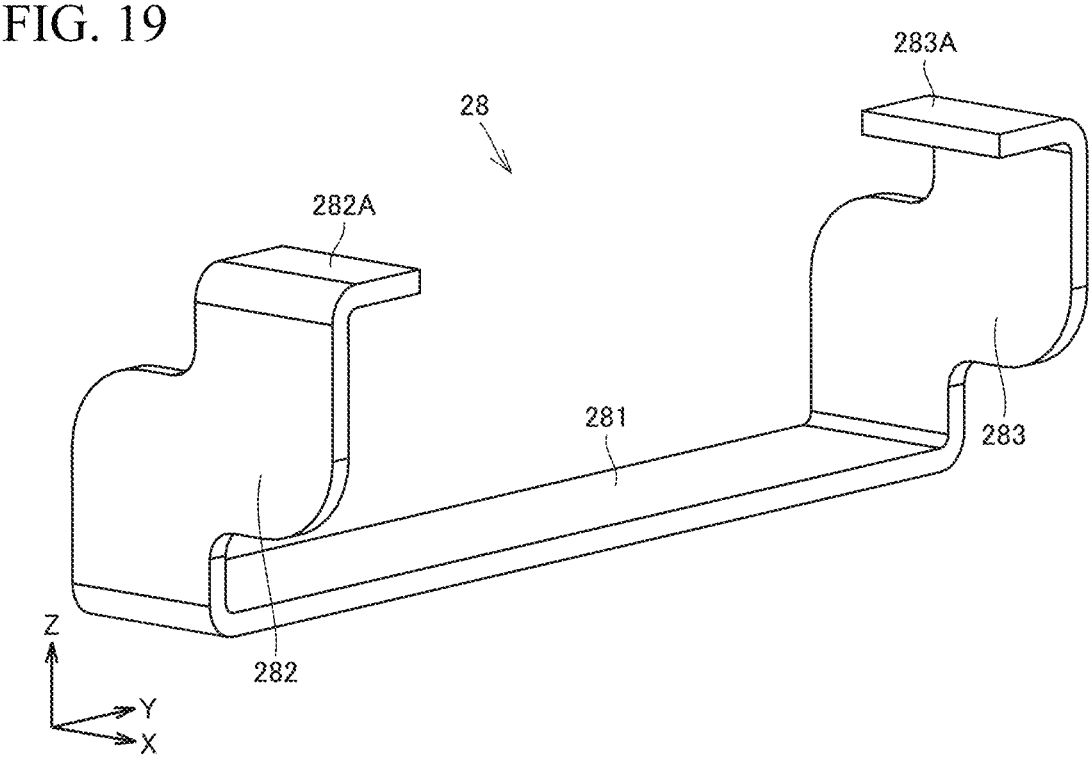
FIG. 19 is a schematic perspective view showing the structure of a connection member.

Referring to FIG. 19, the connection member 28 includes a bottom plate portion 281, a first side plate portion 282, and a second side plate portion 283. The bottom plate portion 281 has a flat plate shape. The bottom plate portion 281 extends along the Y axis direction. Referring to FIGS. 17, 18, and 19, the bottom plate portion 281 can be fitted in the recess 224 of the end cap 22. The first side plate portion 282 extends along the Z axis direction from one end of the bottom plate portion 281. The first side plate portion 282 has a hook portion 282A that bends along the Y axis direction. The hook portion 282A extends along the bottom plate portion 281. Referring to FIGS. 17 and 19, the hook portion 282A can be fitted in the recess 222 of the end cap 22. The second side plate portion 283 extends along the Z axis direction from another end of the bottom plate portion 281. The second side plate portion 283 has a hook portion 283A that bends along the Y axis direction. The hook portion 283A extends along the bottom plate portion 281.

Referring to FIGS. 15, 17, and 18, the protruding portion 275 in the circulation component 24 is fitted in the recess 227 of the end cap 22. Referring to FIG. 13, the circulation component 24 is attached to the end cap 23 in a similar manner. Referring to FIGS. 17 and 19, the hook portion 282A in the connection member 28 is fitted in the recess 222 of the end cap 22. Referring to FIG. 13, the connection member 28 is attached to the end cap 23 in a similar manner. Referring to FIG. 13, the carriage 21 is disposed between the end cap 22 and the end cap 23. At this time, the carriage 21 is arranged such that the positions of the through holes 21A formed in the carriage 21 are aligned with the positions of the screw holes formed in the nuts 278 and 279.

Referring to FIGS. 14, 15, and 16, a first circulation passage (return passage) 55 is formed between a wall surface 272A surrounding the sixth recess 272 of the circulation component 24 and an inner wall surface 21B of the steel plate constituting the carriage 21. A second circulation passage (return passage) 56 is formed between a wall surface 273A surrounding the seventh recess 273 of the circulation component 24 and the inner wall surface 21B of the steel plate constituting the carriage 21.

According to the linear motion guide bearing 1 of Embodiment 2 above as well, the balls 31 and 32 can be allowed to circulate smoothly even when the linear motion guide bearing 1 is reduced in size, as in Embodiment 1. The balls 31 and 32 in the present embodiment have a diameter of 2 mm, for example.

In the above embodiment, the circulation component 24 is made of resin. Adopting such a circulation component 24 further facilitates mass production of the linear motion guide bearing 1.

Variation

Figure 20:
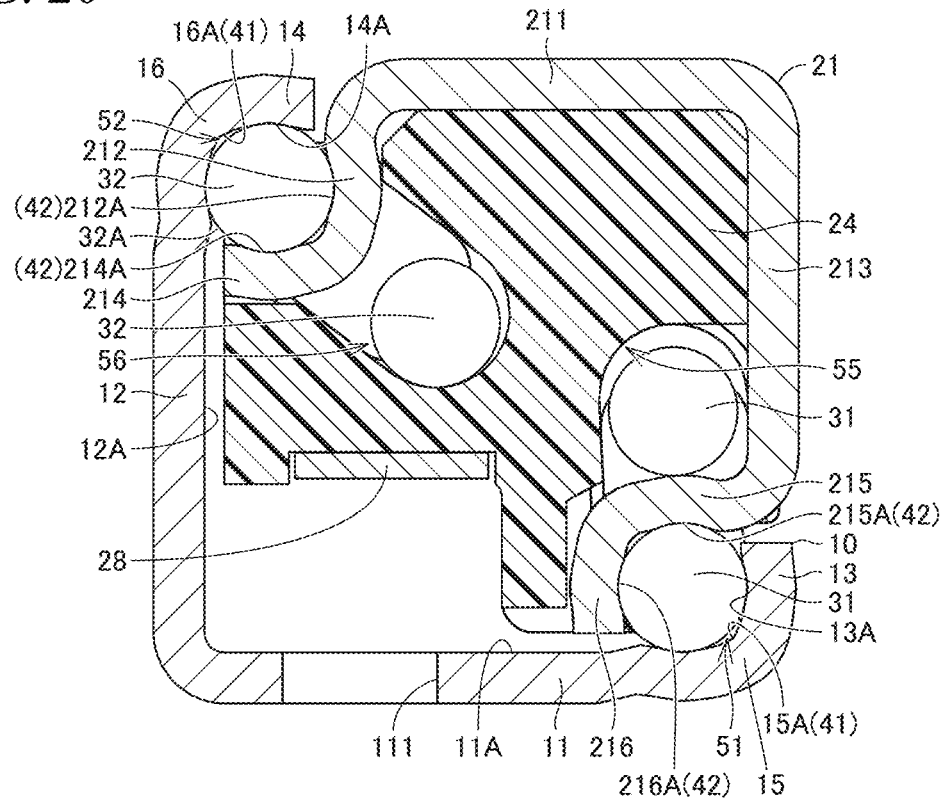
FIG. 20 is a schematic cross-sectional view showing a variation of the linear motion guide bearing in Embodiment 2.
Figure 21:
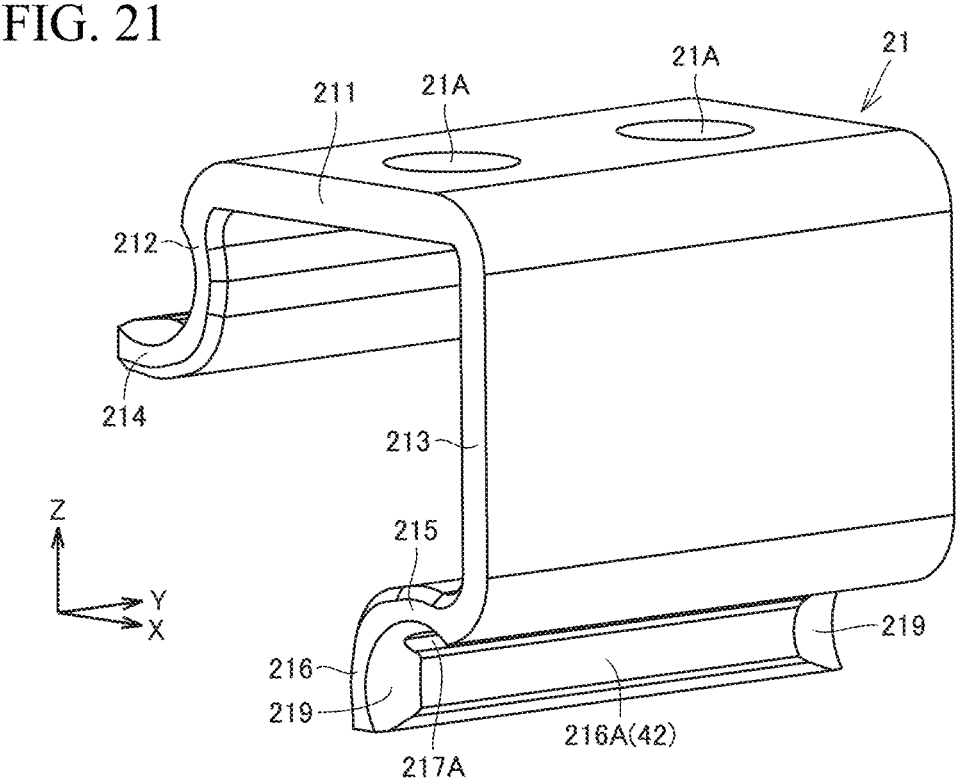
FIG. 21 is a schematic perspective view showing the structure of a first member.
Figure 22:
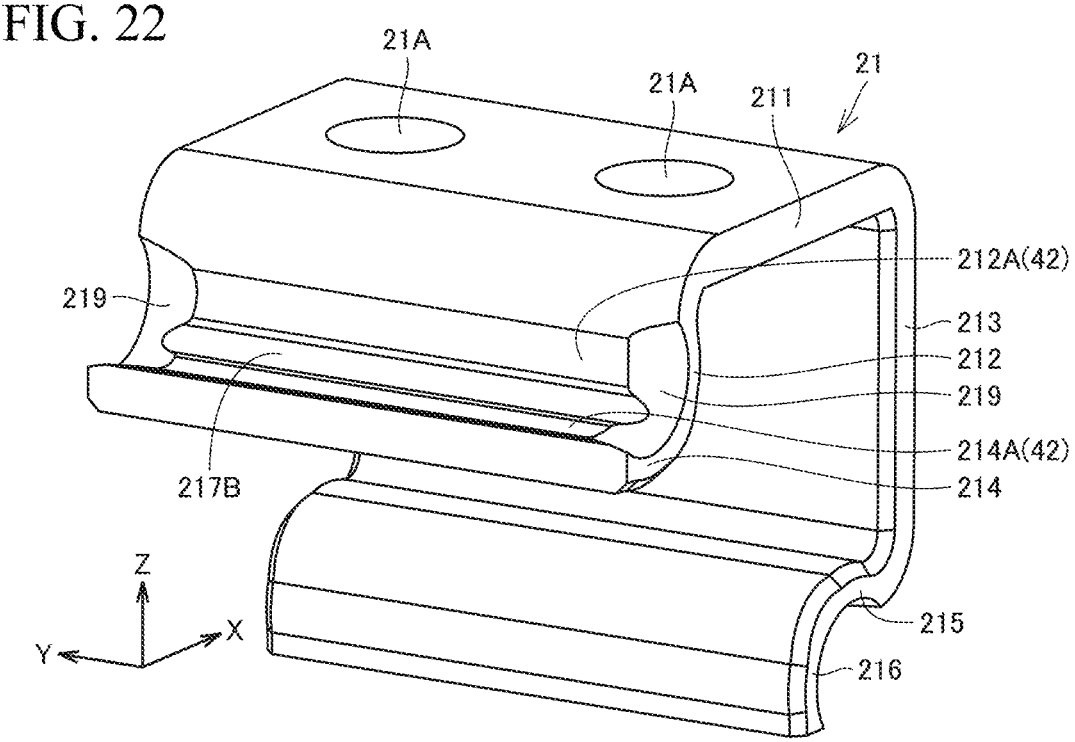
FIG. 22 is a schematic perspective view showing the structure of the first member.

A description will now be made of a variation of the linear motion guide bearing 1 in Embodiment 2. FIG. 20 is a schematic cross-sectional view of a variation of the linear motion guide bearing 1 in Embodiment 2. FIG. 20 is a cross-sectional view of the linear motion guide bearing 1 taken along B-B in FIG. 13. FIG. 21 is a schematic perspective view showing the structure of a first component. FIG. 22 is a perspective view showing the structure of the first component seen from a different point of view from FIG. 21.

Referring to FIGS. 20, 21, and 22, on the outer wall surface of the region in the carriage 21 where the fifth portion 215 and the sixth portion 216 are connected, an arc-shaped groove 217A is formed extending along the Y axis direction. On the outer wall surface of the region where the second portion 212 and the fourth portion 214 are connected, an arc-shaped groove 217B is formed extending along the Y axis direction. On the wall surface of the first load-carrying race (load race) 51 surrounding the groove 217A and on the wall surface of the second load-carrying race (load race) 52 surrounding the groove 217B, the grooves 271A and 271B are formed to avoid contact with the balls 31 and 32. That is, the grooves 217A and 217B are clearance grooves for the balls 31 and 32. The grooves 217A and 217B as described above can be easily produced by compression molding, for example. With this configuration adopted, a ball 31 contacts the second rolling surface 42 at two points with the groove 217A therebetween. Similarly, a ball 32 contacts the second rolling surface 42 at two points with the groove 217B therebetween. This ensures smooth rolling of the balls 31 and 32 on the second rolling surfaces 42. The first rolling surfaces 41 and the second rolling surfaces 42 are R grooves and have a gothic arch shape. While the case where the arc-shaped grooves 217A and 217B are formed has been described in the above embodiment, not limited thereto, the grooves 217A and 271B may have a triangular or other recessed shape, for example, in a cross section perpendicular to the Y axis direction.

The fifth portion 215 and the sixth portion 216 have, on their both ends, chamfered portions 219 that are tapered regions where the steel plate is reduced in thickness as it approaches the ends of the fifth portion 215 and the sixth portion 216. On both ends of the second portion 212 and the fourth portion 214, chamfered portions 219 are formed, which are tapered regions where the steel plate is reduced in thickness as it approaches the ends of the second portion 212 and the fourth portion 214. Adopting such a configuration allows the balls 31 and 32 to circulate smoothly between the carriage 21 and the end cap 22 and between the carriage 21 and the end cap 23. That is, the balls 31 and 32 are allowed to circulate smoothly when entering a load race (first load-carrying race (load race) 51, second load-carrying race (load race) 52) from a non-loaded turnaround passage (third circulation passage (first turnaround passage) 53, fourth circulation passage (second turnaround passage) 54, fifth circulation passage (third turnaround passage) 57, sixth circulation passage (fourth turnaround passage) 58).

Embodiment 3

A description will now be made of Embodiment 3 of the linear motion guide bearing 1 of the present disclosure. The linear motion guide bearing 1 in Embodiment 3 basically has a similar structure and exerts similar effects as the linear motion guide bearing 1 in Embodiment 1. However, Embodiment 3 differs from Embodiment 1 in that the end caps 22 and 23, in place of the circulation component 24, constitute the first circulation passage (return passage) 55 and the second circulation passage (return passage) 56. The points different from the case of Embodiment 1 will be mainly described below.

Figure 23:
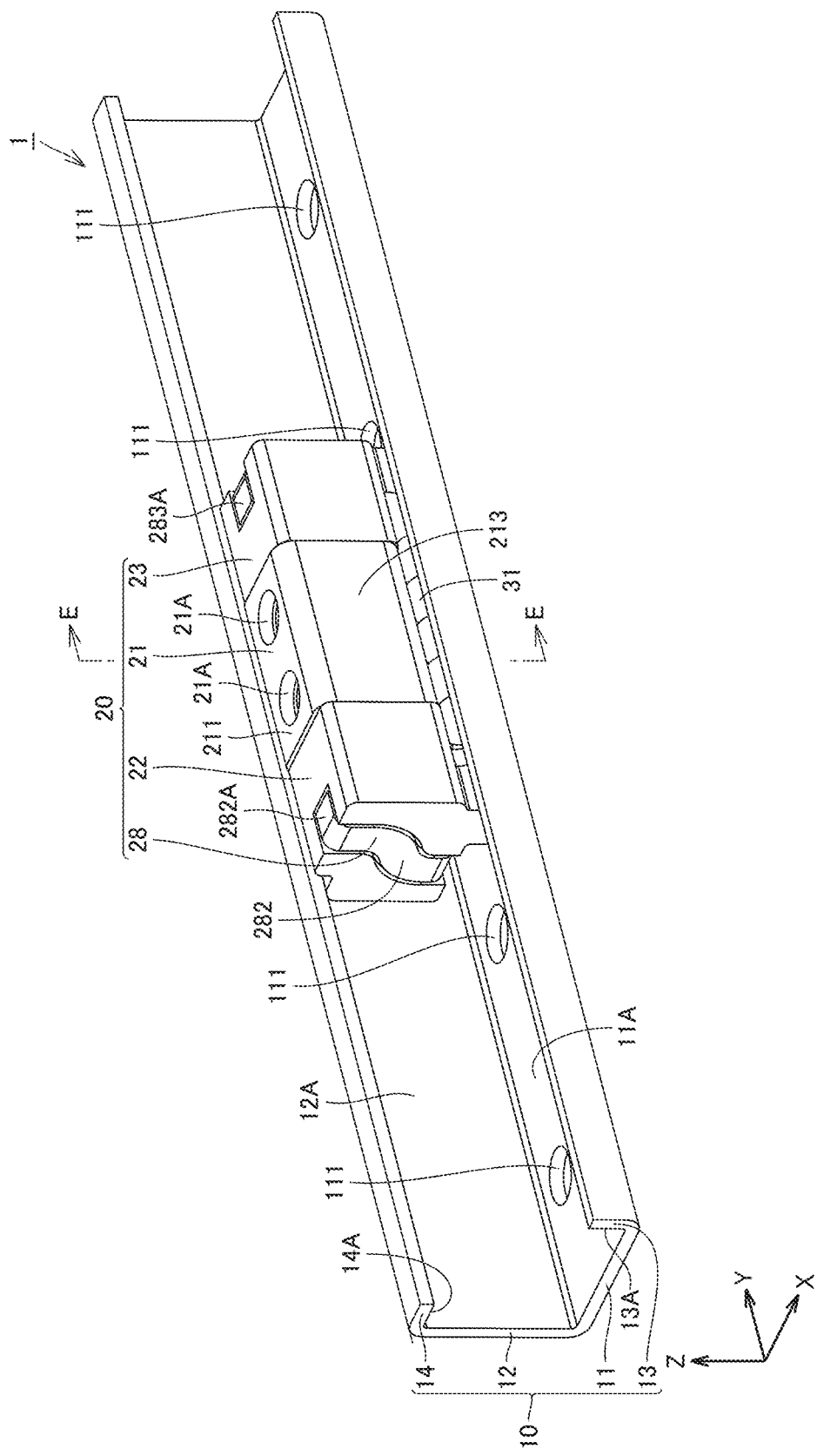
FIG. 23 is a schematic perspective view showing the structure of a linear motion guide bearing in Embodiment 3.
Figure 24:
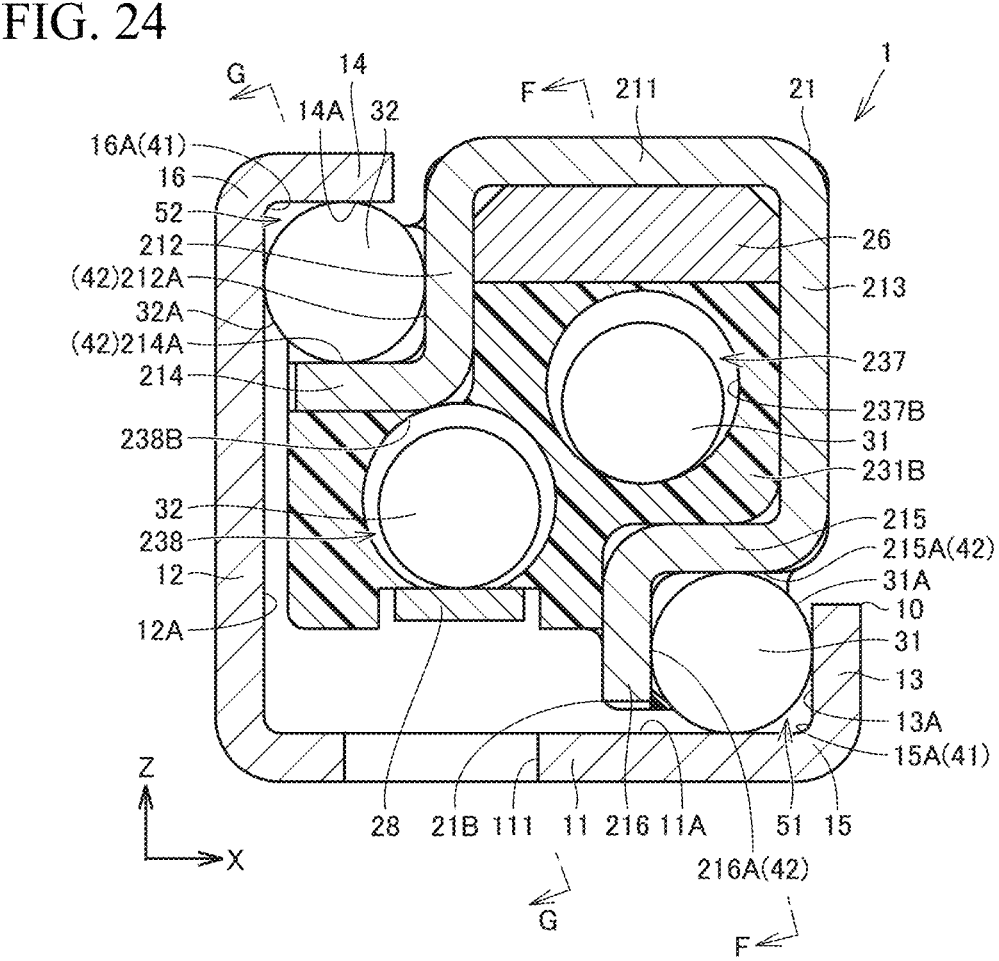
FIG. 24 is a schematic cross-sectional view showing the structure of the linear motion guide bearing in Embodiment 3.
Figure 25:
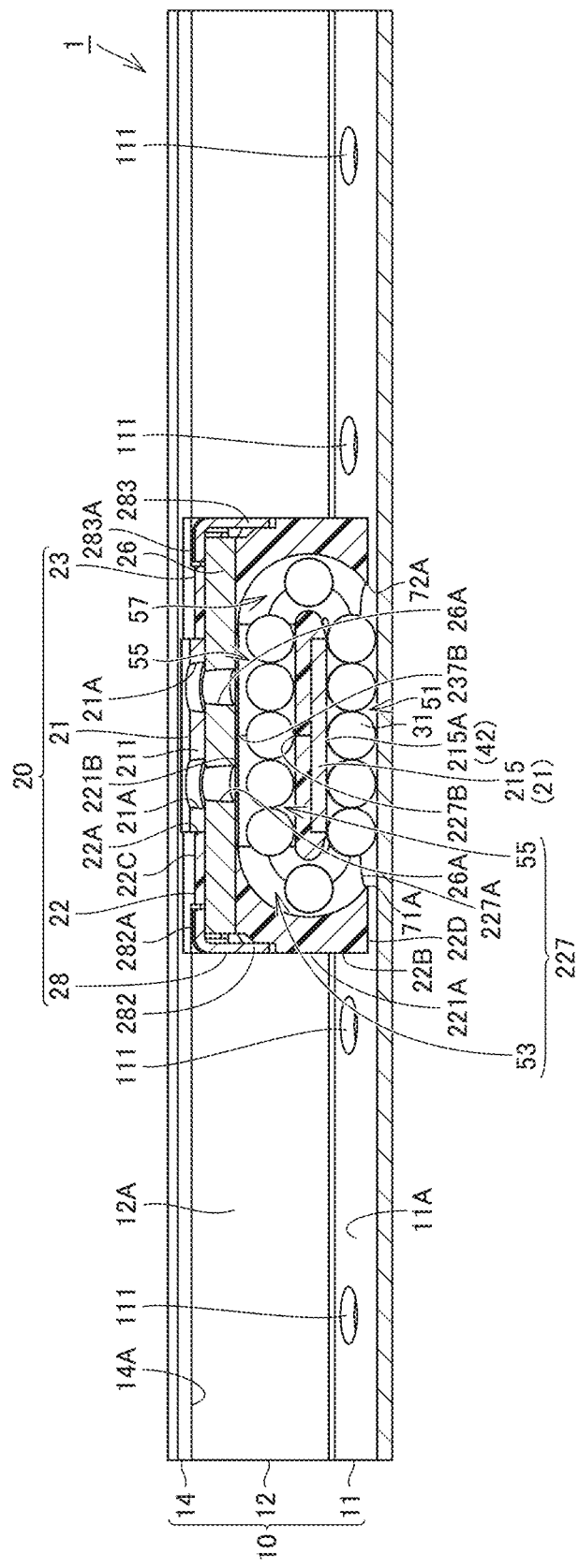
FIG. 25 is a schematic cross-sectional view showing the structure of the linear motion guide bearing in Embodiment 3.
Figure 26:
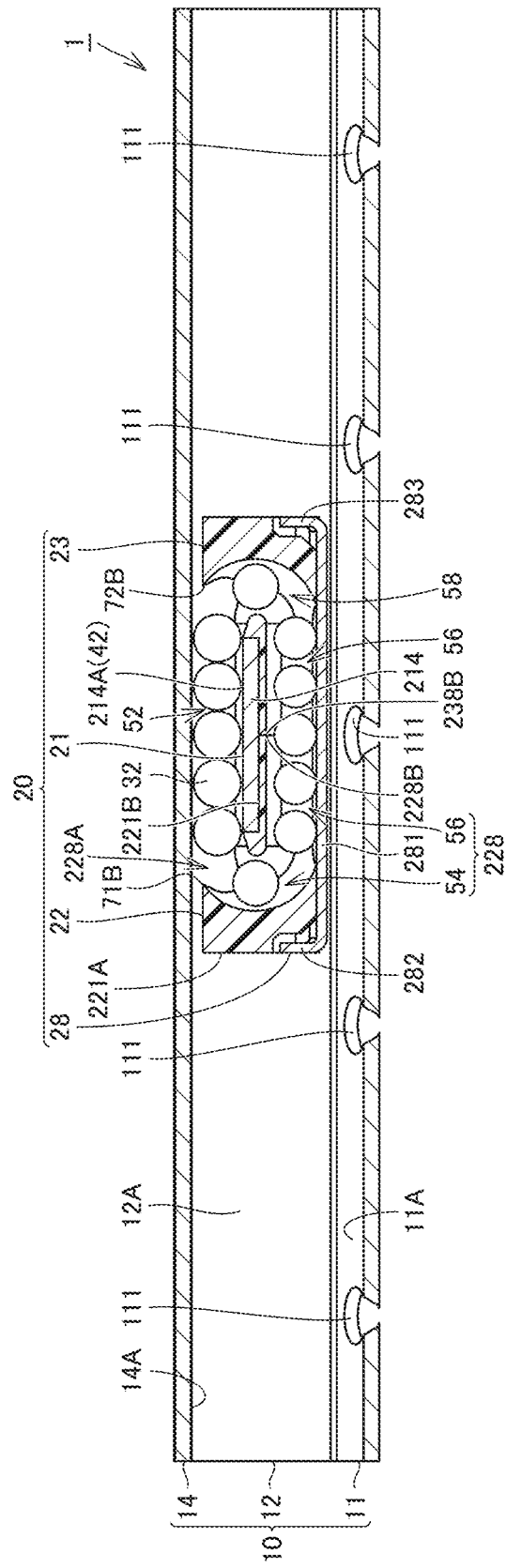
FIG. 26 is a schematic cross-sectional view showing the structure of the linear motion guide bearing in Embodiment 3.
Figure 27:
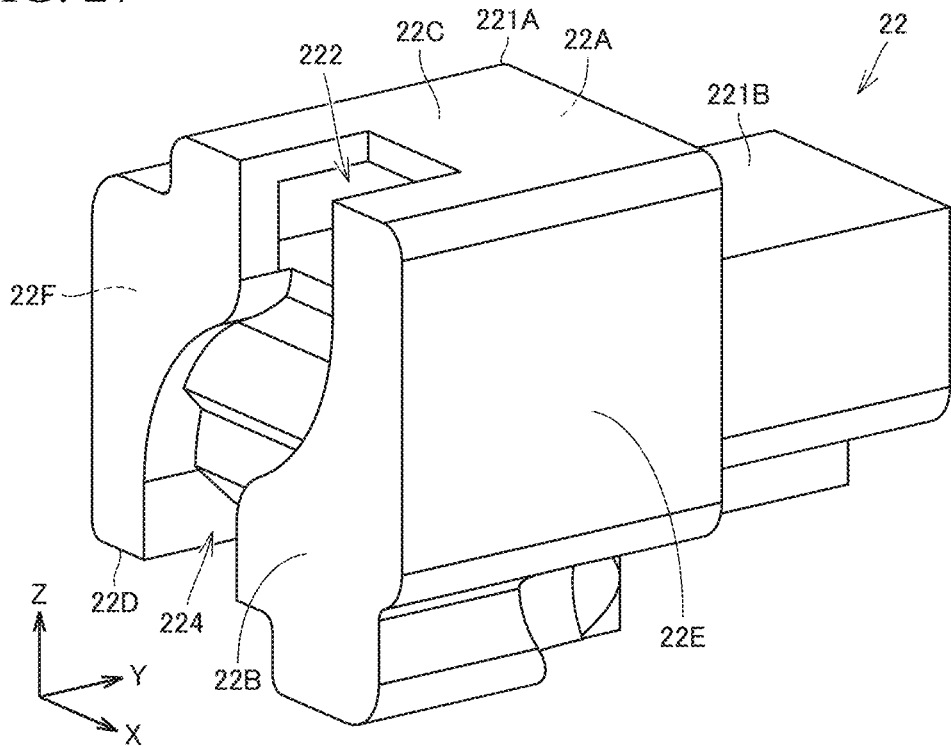
FIG. 27 is a schematic perspective view showing the structure of an end cap.
Figure 28:
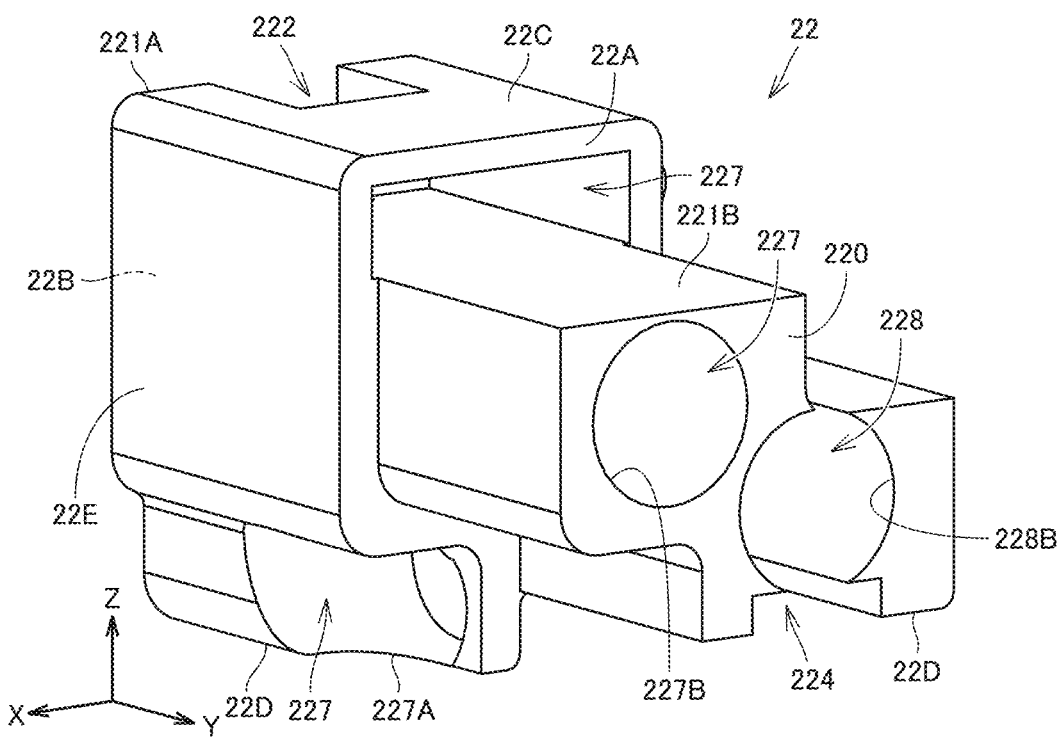
FIG. 28 is a schematic perspective view showing the structure of the end cap.
Figure 29:
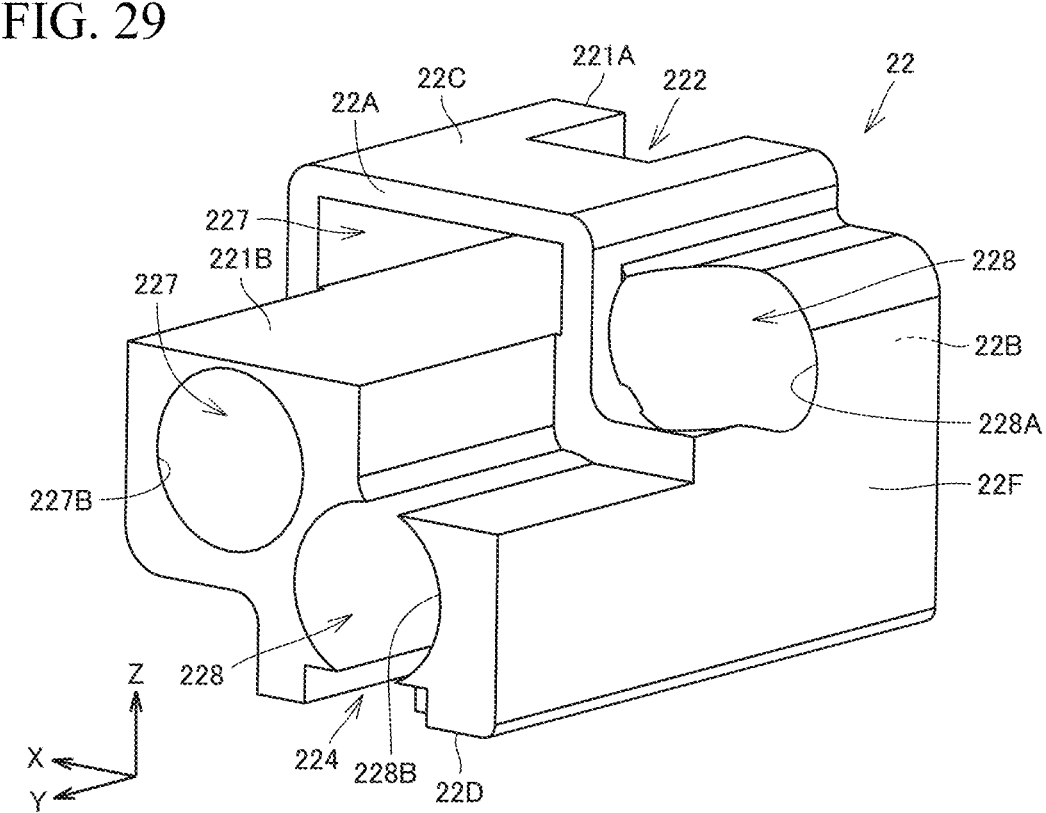
FIG. 29 is a schematic perspective view showing the structure of the end cap.

FIG. 23 is a schematic perspective view showing the structure of a linear motion guide bearing 1 in Embodiment 3. FIG. 24 is a cross-sectional view of the linear motion guide bearing 1 taken along E-E (center in the Y axis direction of the slider 20) in FIG. 23. FIG. 25 is a cross-sectional view of the linear motion guide bearing 1 taken along F-F in FIG. 24. FIG. 26 is a cross-sectional view of the linear motion guide bearing 1 taken along G-G in FIG. 24. FIG. 27 is a schematic perspective view showing the structure of an end cap 22. FIGS. 28 and 29 are perspective views showing the structure of the linear motion guide bearing 1 seen from different points of view from FIG. 27.

Referring to FIGS. 23 and 24, a slider 20 includes a carriage 21 as a first component, end caps 22 and 23 as second and third components, a connection member 28, and a female threaded component 26. The end caps 22 and 23 are made of resin. In the present embodiment, the end cap 22 and the end cap 23 have plane symmetrical shapes with the E-E cross section as the reference plane. Referring to FIGS. 23, 27, 28, and 29, the end cap 22 includes a body portion 221A and a protruding portion 221B. The body portion 221A has a surface 22A in contact with the carriage 21, a surface 22B opposite to the surface 22A in the Y axis direction, and surfaces 22C, 22D, 22E, and 22F connecting the surface 22A and the surface 22B. The end cap 22 has a protruding portion 221B that protrudes along the Y axis direction from the surface 22A of the body portion 221A.

The end cap 22 has a through hole 227 formed penetrating from an end face 220 of the protruding portion 221B to the surface 22E. The surface 22E has one opening 227A of the through hole 227 formed therein. Another opening 227B of the through hole 227 is formed in the end face 220 of the protruding portion 221B. The end cap 22 has a through hole 228 formed penetrating from the end face 220 of the protruding portion 221B to the surface 22F. The surface 22F has one opening 228A of the through hole 228 formed therein. Another opening 228B of the through hole 228 is formed in the end face 220 of the protruding portion 221B. On the end face 220 of the protruding portion 221B, the opening 227B of the through hole 227 and the opening 228B of the through hole 228 are formed apart from each other.

Referring to FIGS. 23, 25, and 26, the end cap 22 and the end cap 23 are arranged aligned in the Y axis direction. At this time, the end caps 22 and 23 are arranged such that the opening 227B of the through hole 227 opposes an opening 237B of a through hole 237 in the end cap 23, and that the opening 228B of the through hole 228 opposes an opening 238B of a through hole 238 in the end cap 23. Then, the carriage 21, the female threaded component 26, and the connection member 28 are attached to the end caps 22 and 23.

Referring to FIGS. 25 and 26, in the end cap 22 and the end cap 23, a first circulation passage 55 (return passage) and a second circulation passage 56 (return passage), extending parallel to the second rolling surfaces 42, are formed across the end caps 22 and 23. The first circulation passage (return passage) 55 and the second circulation passage (return passage) 56 are formed along the longitudinal direction (Y axis direction) of the rail 10. In the end cap 22, a third circulation passage 53 (first turnaround passage) connecting the first circulation passage (return passage) 55 and the first load-carrying race (load race) 51 and a fourth circulation passage 54 (second turnaround passage) connecting the second circulation passage (return passage) 56 and the second load-carrying race (load race) 52 are formed. In the end cap 23, a fifth circulation passage 57 (third turnaround passage) connecting the first circulation passage (return passage) 55 and the first load-carrying race (load race) 51 and a sixth circulation passage (fourth turnaround passage) 58 connecting the second circulation passage (return passage) 56 and the second load-carrying race (load race) 52 are formed. The first circulation passage (return passage) 55 and the first load-carrying race (load race) 51 are formed with the carriage 21 sandwiched therebetween. The second circulation passage (return passage) 56 and the second load-carrying race (load race) 52 are formed with the carriage 21 sandwiched therebetween. In this manner, the first load-carrying race (load race) 51, the first circulation passage (return passage) 55, the third circulation passage (first turnaround passage) 53, and the fifth circulation passage (third turnaround passage) 57 form an annular space. The second load-carrying race (load race) 52, the second circulation passage (return passage) 56, the fourth circulation passage (second turnaround passage) 54, and the sixth circulation passage (fourth turnaround passage) 58 form an annular space. In other words, the end caps 22 and 23 in combination form the first circulation passage (return passage) 55 and the second circulation passage (return passage) 56.

According to the linear motion guide bearing 1 of Embodiment 3 above as well, the balls 31 and 32 are allowed to circulate smoothly even when the linear motion guide bearing 1 is reduced in size, as in Embodiment 1.

Adopting the end caps 22 and 23 in the above embodiment can restrict an increase in the number of components as compared to the linear motion guide bearing 1 in Embodiment 1, and also ensure smooth circulation of the balls 31 and 32. Further, the first circulation passage (return passage) 55 and the third circulation passage (first turnaround passage) 53 are formed integrally, with no joint formed between the first circulation passage (return passage) 55 and the third circulation passage (first turnaround passage) 53. The first circulation passage (return passage) 55 and the fifth circulation passage (third turnaround passage) 57 are formed integrally, with no joint formed between the first circulation passage (return passage) 55 and the fifth circulation passage (third turnaround passage) 57. With the joints thus eliminated, no steps are formed, allowing the balls 31 and 32 to circulate smoothly and endlessly. Although joints are formed where the end caps 22 and 23 contact each other, the number of joints can be reduced as compared to Embodiments 1 and 2.

While the case where the balls 31, 32 are adopted as the rolling elements has been described in the above embodiments, not limited thereto, rollers may be adopted as the rolling elements. While the case where the balls 31, 32 each contact the first and second rolling surfaces 41, 42 at four points has been described in the above embodiments, not limited thereto, a configuration with a circular arc shape providing two-point contact may also be adopted.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A linear motion guide bearing comprising:
a rail made of a steel plate, having a pair of first rolling surfaces extending parallel to each other in a longitudinal direction;
a slider having a pair of second rolling surfaces extending parallel to each other and opposing the pair of first rolling surfaces, respectively; and
a plurality of rolling elements disposed to be able to roll on the first and second rolling surfaces;
the slider having a pair of circulation passages formed therein, the circulation passages being spaces connecting one end and another end in each of a pair of load-carrying races, the load-carrying races being spaces between the pair of first rolling surfaces and the pair of second rolling surfaces,
the plurality of rolling elements circulating in annular spaces configured from the load-carrying races and the circulation passages,
in a cross section perpendicular to the longitudinal direction, the rail includes:
a bottom wall portion,
a first side wall portion rising from one end of the bottom wall portion,
a second side wall portion rising from another end of the bottom wall portion and opposing the first side wall portion, and
a top wall portion extending from an end of the first side wall portion opposite to the bottom wall portion to oppose the bottom wall portion,
one of the first rolling surfaces being made up of wall surfaces of the second side wall portion and the bottom wall portion on an inner side of a first corner portion, the first corner portion being a region where the second side wall portion and the bottom wall portion are connected,
the other of the first rolling surfaces being made up of wall surfaces of the first side wall portion and the top wall portion on an inner side of a second corner portion, the second corner portion being a region where the first side wall portion and the top wall portion are connected,
wherein the slider includes
a first component made of a bent steel plate, the first component having the pair of second rolling surfaces,
a second component fixed to the first component in such a manner that a first circulation passage as a part of one of the pair of the circulation passages and a second circulation passage as a part of the other of the pair of the circulation passages are formed between the second component and a surface of the steel plate constituting the first component opposite to the surface on which the second rolling surfaces are formed,
a third component made of resin, disposed at one end of the first component in the longitudinal direction of the rail, and fixed to the first component so as to form a first turnaround passage connecting one of the load-carrying races and the first circulation passage and a second turnaround passage connecting the other of the load-carrying races and the second circulation passage, and
a fourth component made of resin, disposed at another end of the first component in the longitudinal direction of the rail, and fixed to the first component so as to form a third turnaround passage connecting the one load-carrying race and the first circulation passage and a fourth turnaround passage connecting the other load-carrying race and the second circulation passage.

2. The linear motion guide bearing according to claim 1, wherein the second component is made of resin.

3. The linear motion guide bearing according to claim 1, wherein the second component includes:
a first member made of resin, with the first circulation passage formed between the first member and the first component, and
a second member made of a bent steel plate, with the second circulation passage formed between the second member and the first component.

4. The linear motion guide bearing according to claim 1, wherein the pair of second rolling surfaces each have a groove formed extending along the longitudinal direction.

5. The linear motion guide bearing according to claim 1, wherein the pair of second rolling surfaces each have chamfered portions formed at both ends.

6. A linear motion guide bearing comprising:
a rail made of a steel plate, having a pair of first rolling surfaces extending parallel to each other in a longitudinal direction;
a slider having a pair of second rolling surfaces extending parallel to each other and opposing the pair of first rolling surfaces, respectively; and
a plurality of rolling elements disposed to be able to roll on the first and second rolling surfaces;
the slider having a pair of circulation passages formed therein, the circulation passages being spaces connecting one end and another end in each of a pair of load-carrying races, the load-carrying races being spaces between the pair of first rolling surfaces and the pair of second rolling surfaces,
the plurality of rolling elements circulating in annular spaces configured from the load-carrying races and the circulation passages,
in a cross section perpendicular to the longitudinal direction, the rail includes:
a bottom wall portion,
a first side wall portion rising from one end of the bottom wall portion,
a second side wall portion rising from another end of the bottom wall portion and opposing the first side wall portion, and
a top wall portion extending from an end of the first side wall portion opposite to the bottom wall portion to oppose the bottom wall portion,
one of the first rolling surfaces being made up of wall surfaces of the second side wall portion and the bottom wall portion on an inner side of a first corner portion, the first corner portion being a region where the second side wall portion and the bottom wall portion are connected,
the other of the first rolling surfaces being made up of wall surfaces of the first side wall portion and the top wall portion on an inner side of a second corner portion, the second corner portion being a region where the first side wall portion and the top wall portion are connected,
wherein
the slider includes
a first component made of a bent steel plate, the first component having the pair of second rolling surfaces,
a second component made of resin, fixed to one end of the first component in the longitudinal direction of the rail, and
a third component made of resin, fixed to another end of the first component in the longitudinal direction of the rail,
the second and third components have a first circulation passage as a part of one of the pair of the circulation passages and a second circulation passage as a part of the other of the pair of the circulation passages formed parallel to the second rolling surfaces across the second and third components,
the second component has formed therein a first turnaround passage connecting one of the load-carrying races and the first circulation passage and a second turnaround passage connecting the other of the load-carrying races and the second circulation passage, and
the third component has formed therein a third turnaround passage connecting the one load-carrying race and the first circulation passage and a fourth turnaround passage connecting the other load-carrying race and the second circulation passage.

* * * * *